US012761330B2

(12) United States Patent
Park et al.

(10) Patent No.: US 12,761,330 B2
(45) Date of Patent: Oct. 13, 2026

(54) MICRO-LIDAR SENSOR

(71) Applicants: Yujin Robot Co., Ltd., Incheon (KR); Miele & Cie. KG, Gütersloh (DE)

(72) Inventors: Seong Ju Park, Incheon (KR); Jae Young Lee, Incheon (KR); Chang Oh Mun, Incheon (KR)

(73) Assignees: Yujin Robot Co., Ltd., Incheon (KR); Miele & Cie. KG, Gütersloh (DE)

( * ) Notice: Subject to any disclaimer, the term of this patent is extended or adjusted under 35 U.S.C. 154(b) by 1034 days.

(21) Appl. No.: 17/905,622

(22) PCT Filed: Mar. 4, 2021

(86) PCT No.: PCT/KR2021/002691
§ 371 (c)(1),
(2) Date: Sep. 2, 2022

(87) PCT Pub. No.: WO2021/177752
PCT Pub. Date: Sep. 10, 2021

(65) Prior Publication Data

US 2023/0139369 A1 May 4, 2023

(30) Foreign Application Priority Data

Mar. 4, 2020 (KR) ........................ 10-2020-0027137
Mar. 4, 2021 (KR) ........................ 10-2021-0028730

(51) Int. Cl.
*G01S 7/48* (2006.01)
*G01S 7/481* (2006.01)
(Continued)

(52) U.S. Cl.
CPC .......... *G01S 7/4868* (2013.01); *G01S 7/4817* (2013.01); *G01S 7/4865* (2013.01); *G01S 17/10* (2013.01); *G01S 17/89* (2013.01)

(58) Field of Classification Search
USPC ........................................................ 356/5.01
See application file for complete search history.

(56) References Cited

U.S. PATENT DOCUMENTS 9,880,263 B2 * 1/2018 Droz ........................ G01S 17/87
11,054,505 B2 * 7/2021 Droz ..................... G01S 17/931
(Continued)

FOREIGN PATENT DOCUMENTS

KR 10-2016-0096454 A 8/2016
KR 10-2017-0132884 A 12/2017
(Continued)

OTHER PUBLICATIONS

International Search Report for PCT/KR2021/002691 by Korean Intellectual Property Office dated Jun. 18, 2021.

*Primary Examiner* — James R Hulka
(74) *Attorney, Agent, or Firm* — BROADVIEW IP LAW, PC

(57) ABSTRACT

The present embodiments provide a rotational scanning LIDAR sensor minimized in size, the sensor adjusting the exposure time and intensity of light according to a scanning situation through a plurality of transmitter/receiver groups positioned on an inclined surface of a rotary module, thereby generating a point cloud having improved distance measurement accuracy to an object, and extracting a relative angle on the basis of a reflective pattern reflected from the object.

16 Claims, 34 Drawing Sheets

(51) Int. Cl.

| | |
|---|---|
| ***G01S 7/486*** | (2020.01) |
| ***G01S 7/4865*** | (2020.01) |
| ***G01S 17/10*** | (2020.01) |
| ***G01S 17/89*** | (2020.01) |

(56) References Cited

U.S. PATENT DOCUMENTS

| | | | | |
|---|---|---|---|---|
| 2014/0111812 | A1* | 4/2014 | Baeg | G01S 17/87<br>356/610 |
| 2016/0291134 | A1* | 10/2016 | Droz | G01S 7/4802 |
| 2018/0149732 | A1* | 5/2018 | Droz | G01S 17/86 |
| 2018/0329066 | A1* | 11/2018 | Pacala | G01S 17/86 |
| 2019/0295318 | A1* | 9/2019 | Levinson | G06N 3/0464 |
| 2020/0238999 | A1* | 7/2020 | Batts | B60W 30/09 |
| 2020/0348402 | A1* | 11/2020 | Ye | G01S 17/42 |
| 2021/0365610 | A1* | 11/2021 | Dolan | G05D 1/0088 |

FOREIGN PATENT DOCUMENTS

| | | | |
|---|---|---|---|
| KR | 10-2018-0001777 | A | 1/2018 |
| KR | 10-1840628 | B1 | 3/2018 |
| KR | 10-1878827 | B1 | 7/2018 |
| KR | 10-2019-0025116 | A | 3/2019 |
| KR | 10-2035018 | B1 | 10/2019 |

* cited by examiner (a)

(b)

One ToF Element

Concept of scanning lidar (a) (b) (c)

MICRO-LIDAR SENSOR

CROSS-REFERENCE TO RELATED APPLICATIONS

This application is a National Phase Entry Application of PCT Application No. PCT/KR2021/002691 filed on Mar. 4, 2021, which claims priority to Korean Patent Application No. 10-2020-0027137 filed on Mar. 4, 2020, and to Korean Patent Application No. 10-2021-0028730 filed on Mar. 4, 2021, in Korean Intellectual Property Office, the entire contents of which are hereby incorporated by reference in its entirety.

TECHNICAL FIELD

The technical field of the present invention relates to a rotational LIDAR sensor.

BACKGROUND ART

The contents described in this section merely provide background information on the present exemplary embodiment but do not constitute the related art.

With the development of robot technology, the utilization of autonomous mobile robots that set and move a route by itself is increasing. In order for an autonomous mobile robot to set a moving path by itself, the autonomous mobile robot should not only be able to recognize the current location and destination and search for a moving path, but also be able to detect and avoid obstacles on the moving path.

It is important to accurately detect surrounding environments and a location of the obstacle by means of a LIDAR sensor which is applied to the mobile robot. A volume and height of the LIDAR sensor may be restricted according to a requested design matter.

(Patent Document 1) Korean Registered Patent Publication No. 10-1878827 (Jul. 10, 2018)

(Patent Document 2) Korean Registered Patent Publication No. 10-1840628 (May 15, 2018)

DISCLOSURE

Technical Problem

Exemplary embodiments of the present invention relate to a rotational scanning LIDAR sensor and a main object of the present invention is to place a plurality of transmitter/receiver groups on an inclined surface of a rotary module and adjust an exposure time and an intensity of light in accordance with a scanning situation through the plurality of transmitter/receiver groups, thereby generating a point cloud having an improved distance measurement accuracy to an object and extracting a relative angle on the basis of a reflective pattern reflected from the object.

Other and further objects of the present invention which are not specifically described can be further considered within the scope easily deduced from the following detailed description and the effect.

Technical Solution

According to an aspect of the present exemplary embodiment, a LIDAR sensor includes: a transmission/reception module which transmits light and receives reflected light; a rotary module which is connected to the transmission/reception module and is rotatable; a connection module which transmits a torque to the rotary module and has the rotary module installed therein; and a fixing module which fixes the connection module thereto and transmits a power to the connection module, and the transmission/reception module analyzes a waveform of the reflected light with one or more frequencies to measure a distance according to a time difference and acquire a point cloud, and a rotary column having a plurality of inclined surfaces is located in a rotation axis position of the rotary module.

The transmission/reception module includes: a plurality of transmission/reception groups in which one or more transmitters and one or more receivers are disposed to be spaced apart from each other to be combined; and a first controller which controls an operation of the plurality of transmission/reception groups, and the plurality of transmission/reception groups is installed on the plurality of inclined surfaces, is disposed in a predetermined horizontal direction while being directed to a predetermined vertical angle, and is disposed in consideration of a center of gravity.

The first controller controls an exposure time and an intensity of the light in accordance with a reference distance which distinguishes a near field from a far field.

The first controller adjusts an exposure time and an intensity of the light based on the remainder obtained by dividing a RPM of the rotary module by a predetermined integer.

A filter which blocks light of a predetermined wavelength band is mounted in the receiver.

In the receiver, pixel arrangement is formed in a rectangular shape and the rectangle is provided at a predetermined tilting angle to increase a vertical resolution.

The transmission/reception module includes a thermometer and the first controller compensates for an error of the measured distance according to a temperature measured by the thermometer based on stored temperature data.

The transmission/reception module extracts a relative angle with a reflector based on a reflection pattern according to the intensity of the reflected light by a reflectance of the reflector.

The first controller outputs a control command about a center direction of the reflector using the relative angle.

The first controller compares the reflective pattern and a stored reference pattern to find a center direction of the reflector in a direction that an error of the difference satisfies a reference range.

The reflective pattern has a first reflective area and a second reflective area and the first controller finds a center direction of the reflector in a direction that a size of the first reflective area and a size of the second reflective area become equal.

The connection module includes: a second bearing disposed at a lower end of the rotary column; and a slip ring which passes through an imaginary line formed by extending the rotary shaft of the second bearing.

The connection module includes a first bearing which is disposed on an upper end of the rotary column and an imaginary line formed by extending the rotation axis of the first bearing matches an imaginary line formed by extending the rotation axis of the second bearing.

The LIDAR sensor further includes a sensor cover which has a protrusion structure which is inserted into a recessed space of the upper end of the rotary column and is connected to the fixing module, and the sensor cover transmits or absorbs light of a predetermined wavelength band.

The LIDAR sensor further includes a display unit which displays status information of the LIDAR sensor at the upper end of the sensor cover.

The connection module includes a first gear disposed at a lower end of the rotary column and a second gear which is disposed in the fixing module to rotate while being engaged with the first gear, the fixing module includes a motor which is disposed on a side surface of the fixing module to rotate the second gear, a rotation axis of the first gear and a rotation axis of the second gear are disposed in parallel, and the rotation axis of the second gear and a rotation axis of the motor match.

The rotary module includes: a second controller which is located at a lower end of the rotary module and calculates a rotational speed and a rotation position of the rotary module or the first gear using a first signal collected by the first signal receiver; and a first signal receiver connected to the second controller.

The fixing module includes: a third controller which is located at a upper side end of the fixing module and calculates a rotational speed and a rotation position of the motor or a second gear using a second signal collected by a second signal receiver; and a second signal receiver which is connected to the third controller.

A plurality of first signal receivers is disposed to be spaced apart from each other, the plurality of first signal receivers compensates for an error of the rotational speed and the rotation position of the rotary module or the first gear according to the result of analyzing the plurality of received first signals.

According to another aspect of the present exemplary embodiment, a mobile object, includes: a LIDAR sensor which transmits light, receives reflected light, analyzes a waveform of the reflected light with one or more frequencies to measure a distance according to the time difference, and acquire a point cloud, and a moving device which is implemented to move the moving object based on the distance, and the LIDAR sensor includes: a transmission/reception module which transmits light and receives reflected light; a rotary module which is connected to the transmission/reception module and is rotatable; a connection module which transmits a torque to the rotary module and has the rotary module installed therein; and a fixing module which fixes the connection module thereto and transmits a power to the connection module, and a rotary column having a plurality of inclined surfaces is located in a rotary shaft position of the rotary module.

Advantageous Effects

As described above, according to the exemplary embodiments of the present invention, a plurality of transmitter/receiver groups located on an inclined surface of the rotary module adjusts an exposure time and an intensity of light in accordance with a scanning situation, thereby generating a point cloud having an improved distance measurement accuracy to an object and extracting a relative angle on the basis of a reflective pattern reflected from the object.

Even if the effects are not explicitly mentioned here, the effects described in the following specification which are expected by the technical features of the present disclosure and their potential effects are handled as described in the specification of the present disclosure.

BEST MODE

Hereinafter, in the description of the present disclosure, a detailed description of the related known functions will be omitted if it is determined that the gist of the present disclosure may be unnecessarily blurred as it is obvious to those skilled in the art and some exemplary embodiments of the present disclosure will be described in detail with reference to exemplary drawings.

Figure 1:
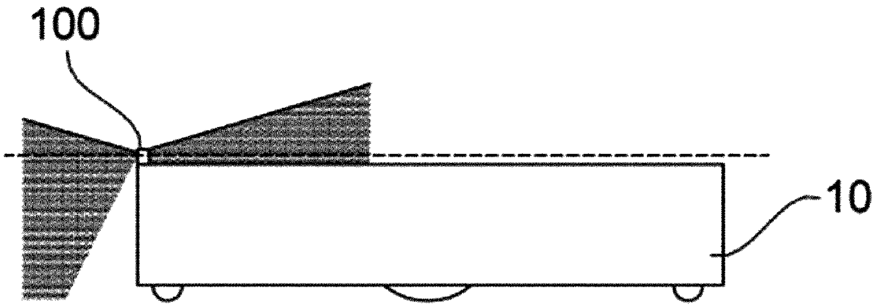
FIG. 1 is a view illustrating a rotating operation of a moving object and a LIDAR sensor according to exemplary embodiments of the present invention.
Figure 1:
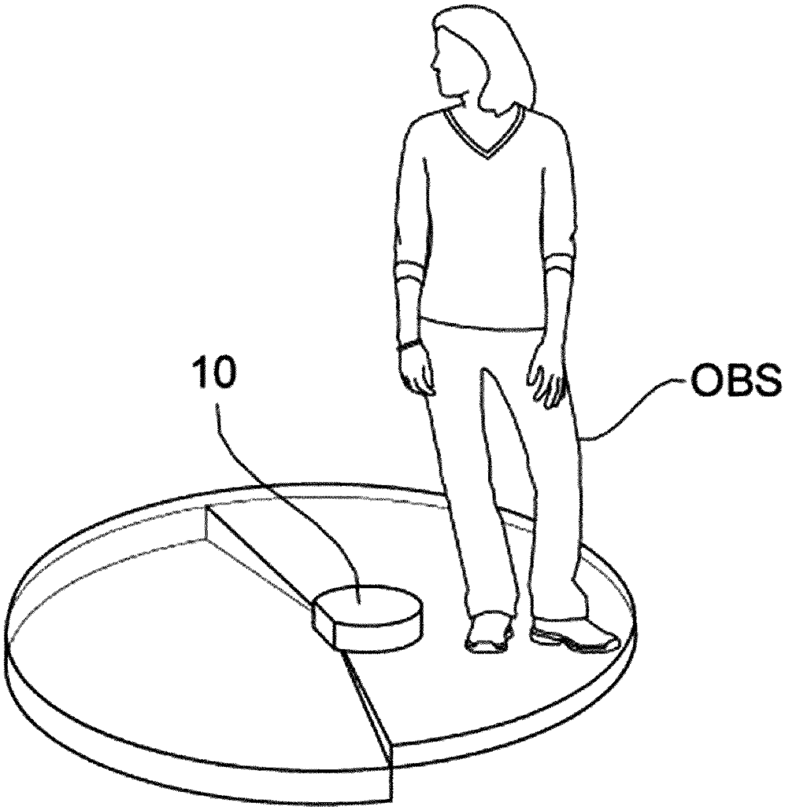
Figure 2:
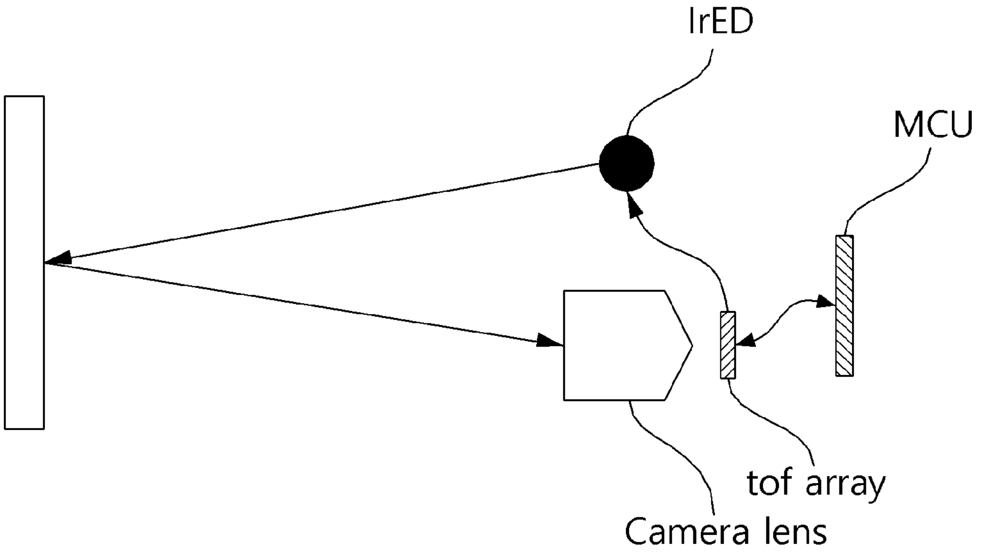
FIG. 2 is a conceptual view illustrating a LIDAR sensor according to an exemplary embodiment of the present invention.
Figure 2:
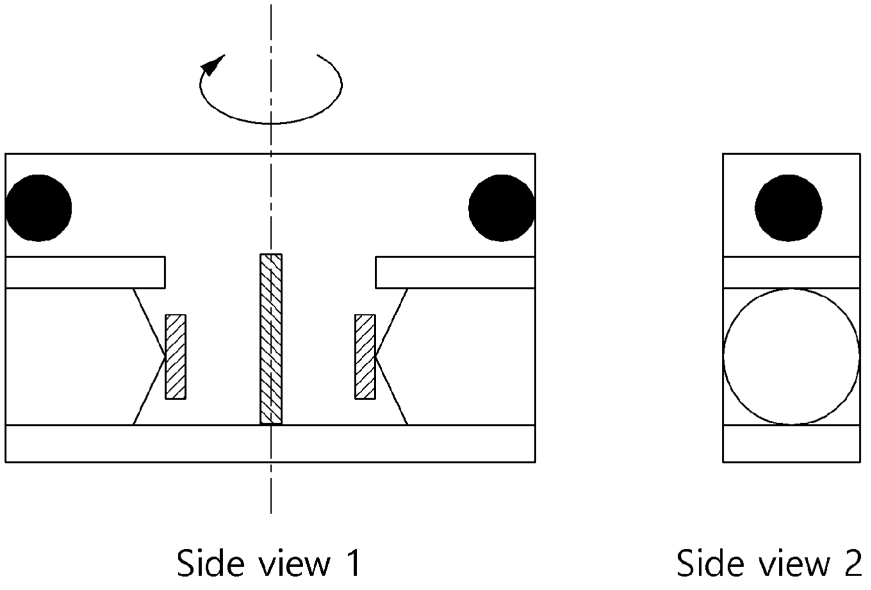

FIG. 1 is a view illustrating a rotating operation of a moving object and a LIDAR sensor according to exemplary embodiments of the present invention and FIG. 2 is a conceptual view illustrating a LIDAR sensor according to an exemplary embodiment of the present invention.

The LIDAR sensor 100 according to the present exemplary embodiment may be applied to a moving object. The LIDAR sensor is applicable to products which require distance measurement, such as flying objects including drones, a moving objects including automobiles, and small home appliances. The moving object includes a LIDAR sensor and a moving device. The moving object includes robot cleaners, logistics robots, toy cars, mobile robots for industrial or military purposes.

The LiDAR is a device which transmits a laser signal, measures a returning time of the reflected signal, and measures a distance to a reflector using a speed of light. The laser signal is converted into an electrical signal by a photo diode. The laser signal may have a predetermined wavelength band.

The distance measuring device may operate by a time of flight (TOF) manner. According to the time of flight manner, a laser emits a pulsed or square wave signal to measure a time when reflection pulses or square wave signals from objects within a measurement range reach a receiver to measure a distance between an object to be measured and the distance measuring device.

The moving device calculates a traveling route based on a distance to the object or detects an obstacle to move the moving object.

The LIDAR sensor transmits a light signal and receives a reflected light signal. The LIDAR sensor emits light to the object by a start control signal and receives light which is reflected from the object to convert the light into an electrical signal. The LIDAR sensor outputs the electrical signal during a predetermined detecting time.

A controller 210 of the LIDAR sensor converts a signal. The controller is connected to the receiver and a signal amplifier is connected.

A light source emits light to the object based on a predetermined sampling period. The sampling period may be set by the controller. The sampling period is a time when the transmitter emits light, the receiver receives reflected light, and the controller converts the light into an electrical signal in accordance with the start control signal. The LIDAR sensor may repeatedly perform this operation in a next sampling period.

The receiver receives light reflected from the object to convert the light into an electrical signal. The receiver extracts an intensity of the electrical signal.

The controller converts the electrical signal to measure an accurate timing and outputs a stop control signal.

The controller converts the electrical signal such that a signal point having a maximum signal magnitude has a predetermined magnitude, adjusts an magnitude of the converted electrical signal, and detect a timing having the predetermined magnitude. The controller converts the electrical signal to generate a stop control signal.

The controller receives an electrical signal from the receiver or the amplifier. The received electrical signal, that is, an input signal rises or falls by the reflected light. The controller exactly measures a target timing for the input signal to output the electrical signal.

The controller may include one or more time to digital converters which convert the difference of two times into the digital value. The input signal of the time to digital converter may be a pulse shape of the same signal source or may be an edge of other signal source. For example, the LIDAR sensor may calculate the time difference based on a rising edge or a falling edge of the start control signal and a rising edge or a falling edge of the stop control signal.

The LIDAR sensor calculates a pulse width based on the rising edge or the falling edge of the stop control signal and adds a factor value which is applied to a function of the pulse width versus walk error to a time of flight which has not been corrected. The LIDAR sensor corrects the time of flight using a pulse width of the reflected signal to calculate the exact time of flight.

The mobile robot may collect environment information (2D/3D space information) and odometry information by means of simultaneous localization and mapping (SLAM), adaptive Monte Carlo localization (AMCL), the LIDAR sensor, and the IMU sensor.

The LIDAR sensor 100 mounted in the moving object 10 rotates to detect the surrounding environments and the obstacles. The LIDAR sensor 100 may detect the obstacle OBS in a direction where the obstacle is located, by the sensed point cloud data.

In order to reduce the size of the LIDAR sensor, all components, for example, the transmitter/receiver module, the rotary module, the connection module, and the fixing module need to be closely combined.

Figure 3:
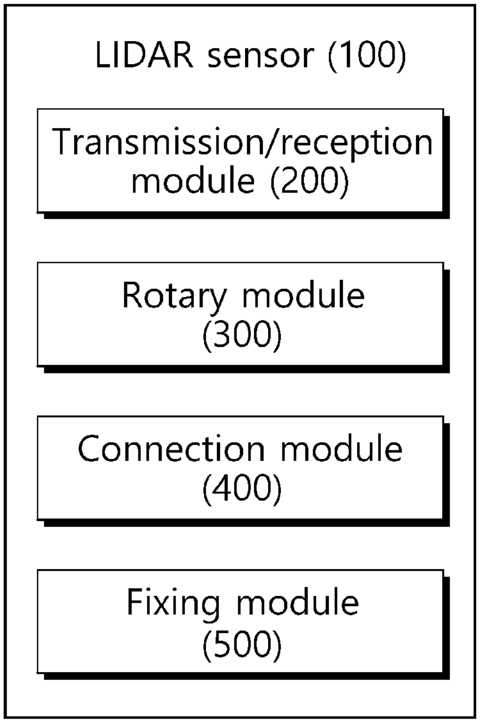
FIG. 3 is a block diagram illustrating a LIDAR sensor according to an exemplary embodiment of the present invention.

FIG. 2 is a conceptual view illustrating a LIDAR sensor according to an exemplary embodiment of the present invention and FIG. 3 is a block diagram illustrating a LIDAR sensor according to an exemplary embodiment of the present invention.

When the transmitter and the receiver are disposed up and down and a rotary plate rotates, the transmitter and the receiver rotate together. The LIDAR sensor adjusts the exposure time and the intensity of the light while rotating to flexibly, dynamically, and accurately measure a distance to the object and the point cloud in a near field and a far field. The LIDAR sensor recognizes a reflective pattern reflected from the object to extract a relative angle with the object and narrow the relative angle to make the reflective pattern and the reference pattern similar.

The LIDAR sensor 100 includes a transmission/reception module 200, a rotary module 300, a connection module 400, and a fixing module 500.

The transmission/reception module 200 transmits light and receives reflected light. The transmission/reception module 200 analyzes a waveform of the reflected light with one or more frequencies to measure a distance according to a time difference and acquire a point cloud. The transmission/reception module 200 analyzes a pulse waveform using a plurality of frequencies and extracts the time difference.

The rotary module 300 is connected to the transmission/reception module 200 and has a rotatable structure. In the position of a rotation axis of the rotary module, a rotary column having a plurality of inclined surfaces is located.

The connection module 400 transmits a torque to the rotary module 300 and the rotary module 300 is installed in the connection module 400.

The connection module 400 is fixed to the fixing module 500 and the fixing module 500 transmits the power and data to the connection module 400. The power and the data are transmitted to the rotary module 300 and the transmission/reception module 200 via the connection module 400.

Figure 4:
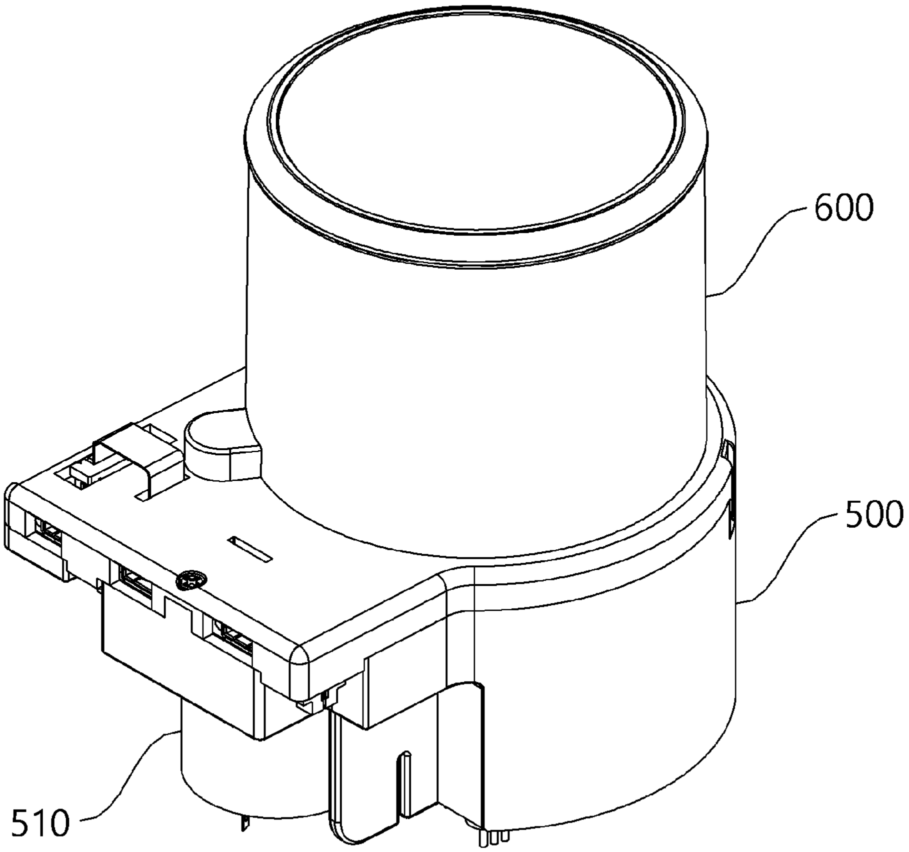
FIG. 4 is a view illustrating a state in which a sensor cover is coupled in a LIDAR sensor according to an exemplary embodiment of the present invention.
Figure 5:
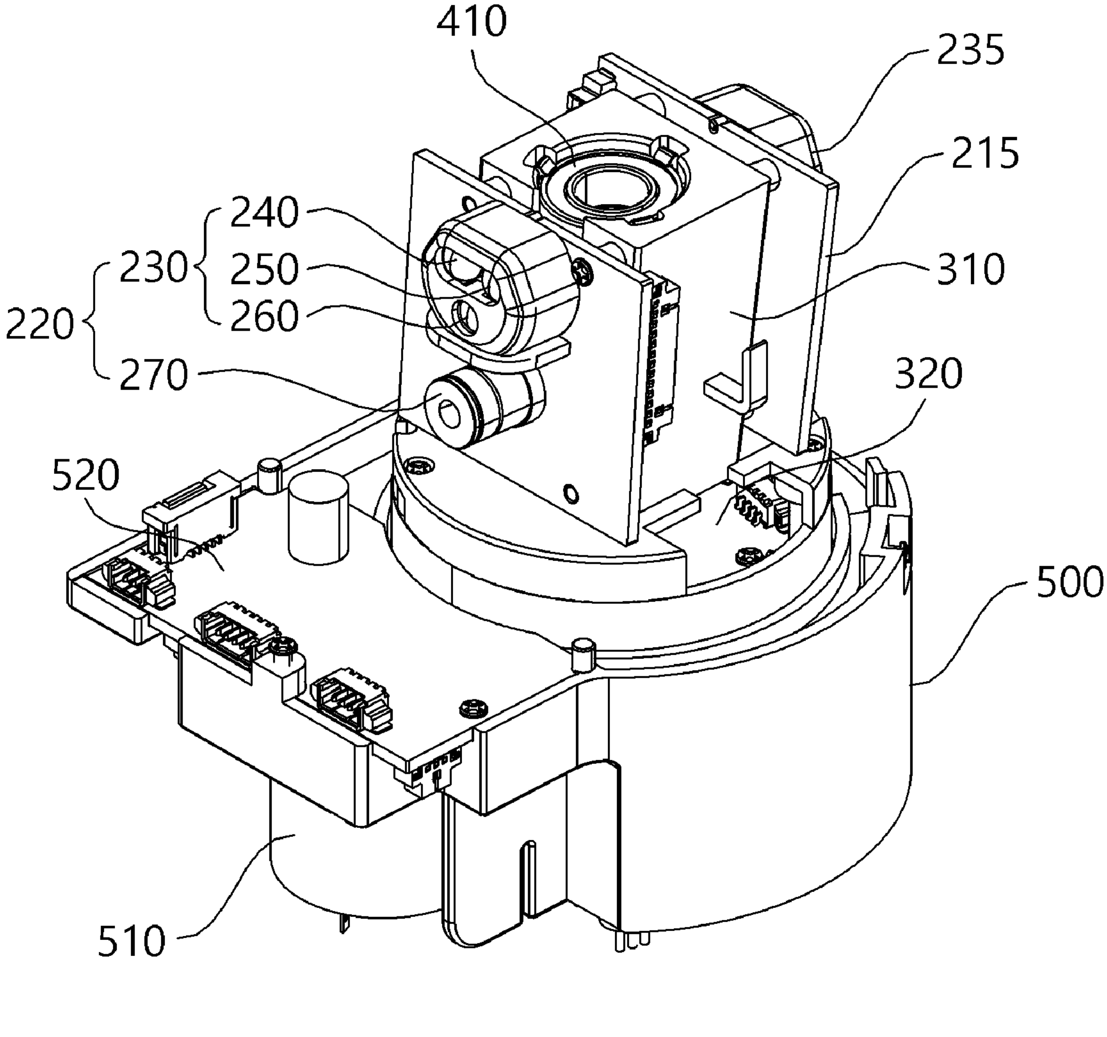
FIG. 5 is a view illustrating a state in which a sensor cover is separated from a LIDAR sensor according to an exemplary embodiment of the present invention.
Figure 6:
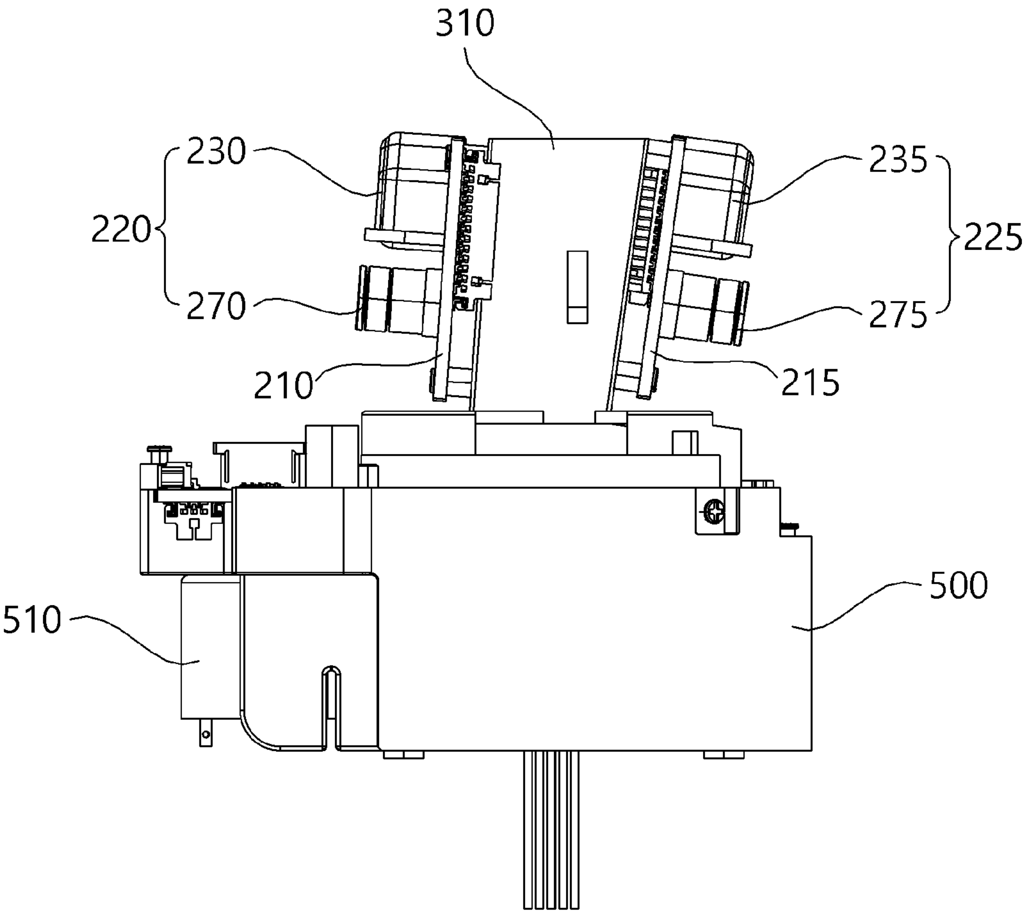
FIG. 6 is a view illustrating a side surface of a LIDAR sensor according to an exemplary embodiment of the present invention.
Figure 7A:
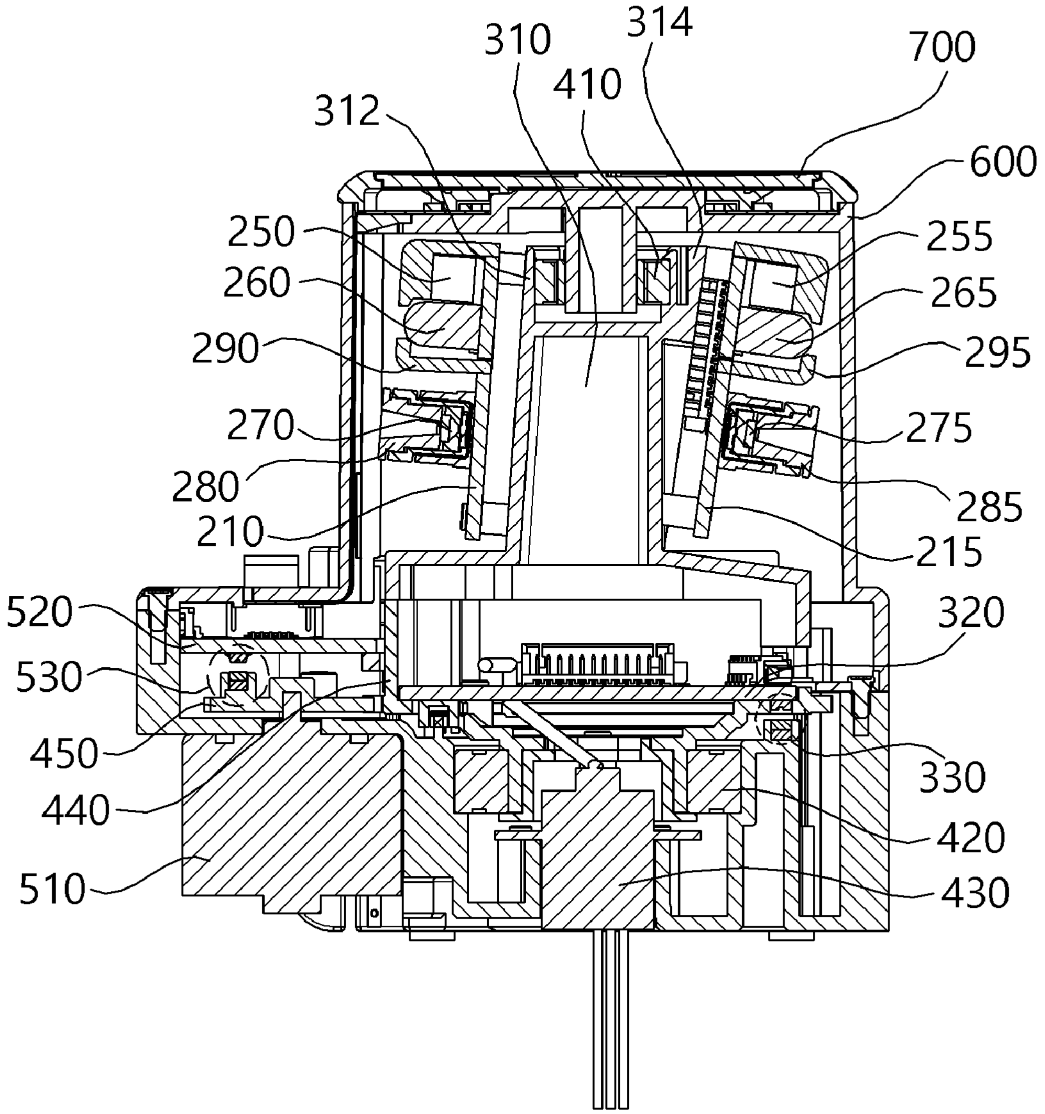
FIGS. 7A and 7B are views illustrating a cross-section of a LIDAR sensor according to an exemplary embodiment of the present invention.
Figure 7B:
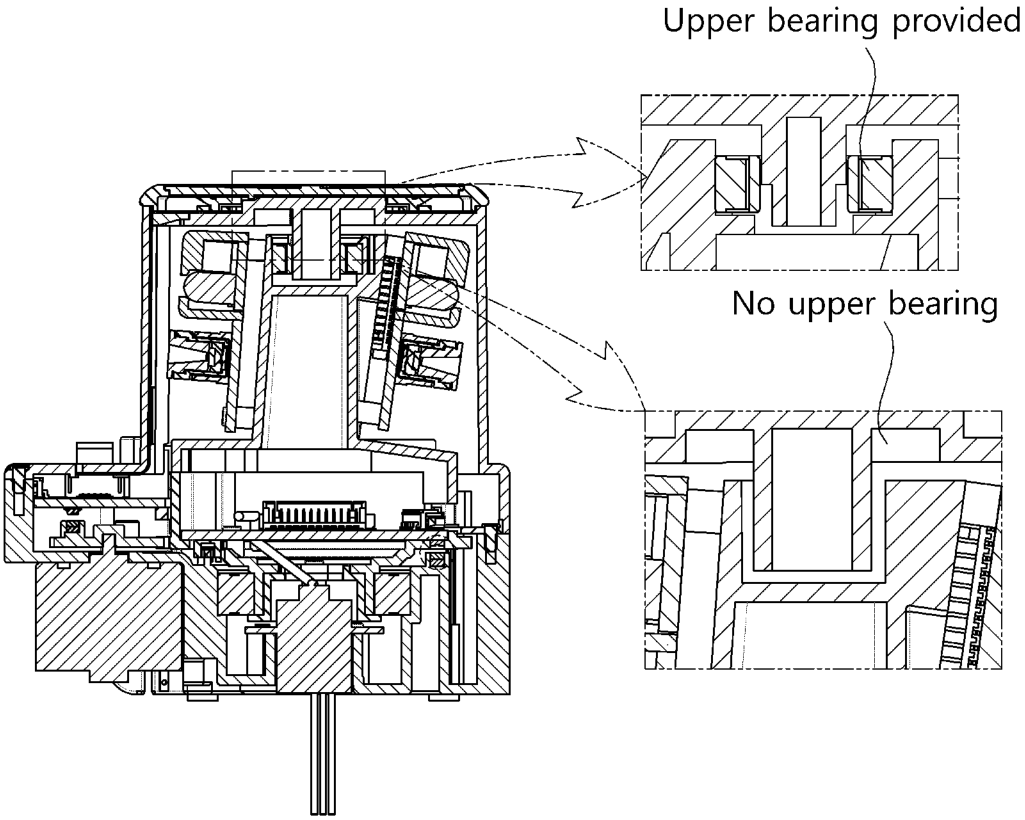
Figure 8:
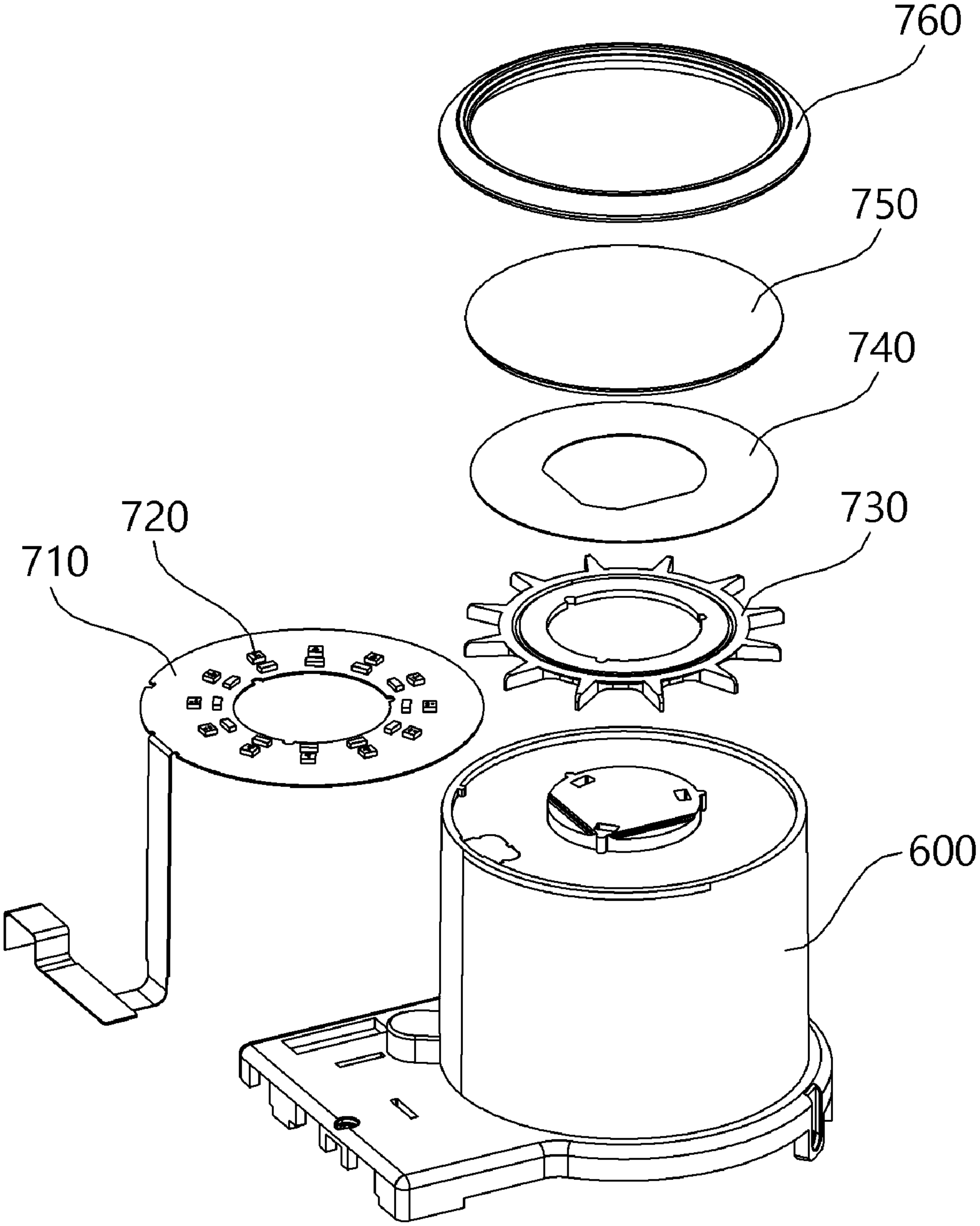
FIG. 8 is an exploded view illustrating a sensor cover and a display unit of a LIDAR sensor according to an exemplary embodiment of the present invention.
Figure 9:
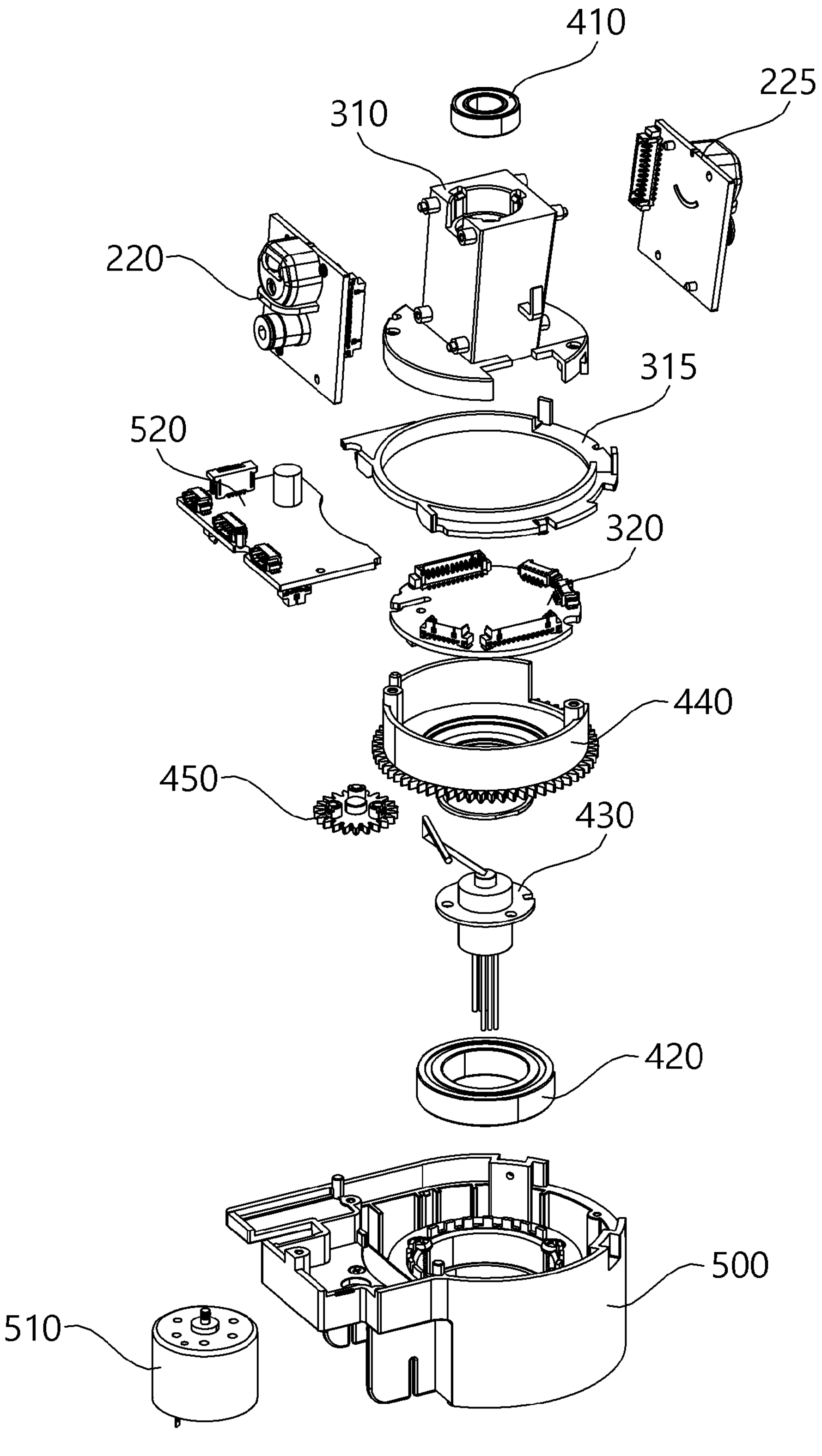
FIG. 9 is an exploded view illustrating a transmission/reception module, a rotary module, a connection module, and a fixing module of a LIDAR sensor according to an exemplary embodiment of the present invention.

FIG. 4 is a view illustrating a state in which a sensor cover is coupled in a LIDAR sensor according to an exemplary embodiment of the present invention. FIG. 5 is a view illustrating a state in which a sensor cover is separated from a LIDAR sensor according to an exemplary embodiment of the present invention. FIG. 6 is a view illustrating a side surface of a LIDAR sensor according to an exemplary embodiment of the present invention. FIG. 7 is a view illustrating a cross-section of a LIDAR sensor according to an exemplary embodiment of the present invention. FIG. 8 is an exploded view illustrating a sensor cover and a display unit of a LIDAR sensor according to an exemplary embodiment of the present invention. FIG. 9 is an exploded view illustrating a transmission/reception module, a rotary module, a connection module, and a fixing module of a LIDAR sensor according to an exemplary embodiment of the present invention.

The transmission/reception module 200 includes a first controller 210 and a plurality of transmission/reception groups 220 and 225.

In the transmission/reception module, one or more transmitters 230 and one or more receivers 270 are disposed to be spaced apart from each other to be combined. Three transmitters 240, 250, and 260 may be disposed. The first transmitter 240 and the second transmitter 250 are horizontally disposed and the third transmitter 260 may be vertically disposed between the first transmitter 240 and the second transmitter 250. The transmitters 230 and 230 may include separation films 290 and 290 which are installed to be spaced apart from body tubes 280 and 285 of the receivers 270 and 275 and block the light traveling path.

The first controller 210 controls the operations of the plurality of transmission/reception groups 220 and 225. The first controller 210 may adjust an exposure time and an intensity of the light of the first transmitter 240, the second transmitter 250, and the third transmitter 260. A reference distance which distinguishes a near field from a far field is considered and a remainder obtained by dividing an RPM of the rotary module by a predetermined integer may be considered.

The plurality of transmission/reception groups 220 and 225 is installed on a plurality of inclined surfaces 312 and 314. The plurality of transmission/reception groups 220 and 225 is directed to a predetermined vertical angle. The plurality of transmission/reception groups 220 and 225 is disposed in a predetermined horizontal direction and is disposed in consideration of a center of gravity.

The rotary module 300 may include a rotary column 310, a column assembly 315, a second controller 320, and a first position sensor set 330. The first position sensor set 330 may include a first signal transmitter 334 and a first signal receiver 332. For example, the first position sensor set 330 may be implemented by a magnet and a hall senor based on a magnet signal. The first position sensor set 330 may be implemented by a protruding structure which passes between photo interrupters and the photo interrupters. The first signal is a signal acquired by the hall sensor or the photo interrupter in accordance with the rotation of the rotary module. The first signal transmitter 334 and the first signal receiver 332 may be installed in the fixing module and in the second controller, respectively. For example, the hall sensor or the photo interrupter may be connected to the second controller and the magnet or the protruding structure may be connected to the inside of the fixing module. The magnet or the protruding structure may be located to be closer to a second gear 450 or the magnet or the protruding structure may be located to be far from the second gear or located in a different direction therefrom. The second controller 320 calculates a rotation speed and a rotation position of the rotary module or the first gear 440 using a first signal collected by the first signal receiver 334. The second controller 320 may transmit the calculated data through the connection module 400.

The connection module 400 includes a second bearing 420 and a slip ring 430. The connection module 400 may include a first bearing 410 or may not include the first bearing as needed. The first bearing 410 may be disposed at an upper end of the rotary column 310. The second bearing 420 may be disposed at a lower end of the rotary column 310. The slip ring 430 is located in a position passing an imaginary line obtained by extending a rotation axis of the second bearing. An imaginary line obtained by extending the rotation axis of the first bearing 410 and the imaginary line obtained by extending the rotation axis of the second bearing 420 may match.

The connection module 400 includes a first gear 440 and a second gear 450. The first gear 440 may be disposed at a lower end of the rotary column or close to the rotary column. The second gear 450 is disposed in the fixing module to rotate while being engaged with the first gear. A rotation axis of the first gear 440 and a rotation axis of the second gear 450 may be disposed to be parallel. A ratio of the first gear 440 and the second gear 450 may be set to M:N.

The first gear 440 has a hole. The first position sensor set 330 may operate by means of a hole of the rotating first gear. The first position sensor set 330 may operate by means of a structure which is attached onto a surface of the first gear which rotates without using a hole. The first position sensor set 330 may operate by means of a structure which is attached onto the other component without using the rotating first gear.

The fixing module 500 includes a motor 510 which rotates the second gear 450 on a side surface of the fixing module 500. A rotation axis of the second gear 450 and a rotation axis of the motor 510 may match.

The fixing module 500 may include the third controller 520 and a second position sensor set 530. The second position sensor set 530 may include a second signal transmitter 534 and a second signal receiver 532. For example, the second position sensor set 530 may be implemented by a magnet and a hall senor based on a magnet signal. The second position sensor set 530 may be implemented by a protruding structure which passes between photo interrupters and the photo interrupters. The second signal is a signal acquired by the hall sensor or the photo interrupter in accordance with the rotation of the second gear. The second signal transmitter 534 and the second signal receiver 532 may be installed in the second gear and in the third controller, respectively. For example, the hall sensor or the photo interrupter may be connected to the third controller and the magnet or the protruding structure may be connected to the gear. The third controller 520 calculates a rotation speed and a rotation position of the module or the second gear using a second signal collected by the second signal receiver 532. The third controller 520 may transmit the calculated data through the connection module 400.

The LIDAR sensor 100 may include a sensor cover 600. The sensor cover 600 is connected to the fixing module with a protrusion structure which may be inserted into a dented space of the upper end of the rotary column. In a state in which the protruding structure is inserted, a non-contact state between the protrusion structure and the rotary column may be maintained with a short distance. When a first bearing is located in the dented space of the upper end of the rotary column, the protruding structure may be inserted into the center of the first bearing. The sensor cover 600 may be formed to have a structure which covers the third controller. The sensor cover 600 may transmit or absorb light with a predetermined wavelength band.

The LIDAR sensor 100 may include a display unit 700 which displays state information of the LIDAR sensor at an upper end of the sensor cover. The display unit 700 may include a power cable 710, a display light source 720, a light source separation wall 730, and multi-layered assemblies 740, 750, and 760.

Figure 10:
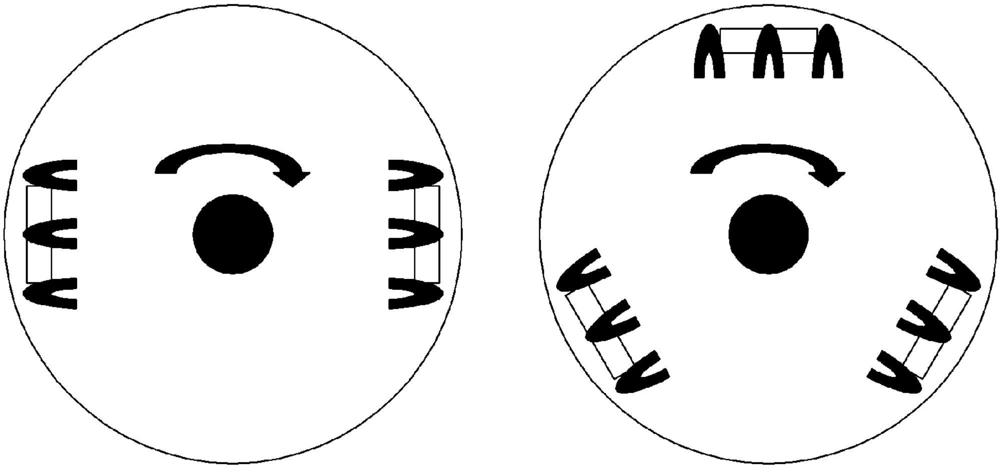
FIG. 10 is a view illustrating a transmission/reception module of a LIDAR sensor according to an exemplary embodiment of the present invention.

FIG. 10 is a view illustrating a transmission/reception module of a LIDAR sensor according to an exemplary embodiment of the present invention.

The transmitter may be implemented by SiPM, IrED, VCSEL, a low power laser. The transmitter forms light emitted through a beam forming unit in a line beam type.

The transmitter and the receiver are disposed up and down. When a rotation plate rotates, the transmitter and the receiver rotate together. A plurality of transmitter and receiver sets may be installed. The controller which is connected to the receiver may be individually implemented for every transmitter and receiver set or one controller may control the transmitter and receiver set.

The transmitter and receiver sets may be installed at the same angle or at different angles. The angle may be set in various forms depending on the design specification.

For example, two sets 220 and 215 are equally disposed in azimuth, one set of two sets is installed to be directed to an elevation angle of 15 degrees and the other one is installed to be directed to an elevation angle of −15 degrees.

For example, three sets are equally disposed in azimuth and are installed to be directed to a horizontal plane with respect to an elevation angle of 0 degree. Among three sets, one set is directed to the elevation angle of 15 degrees and the other one is installed to be directed to the elevation angle of −15 degrees.

Figure 11:
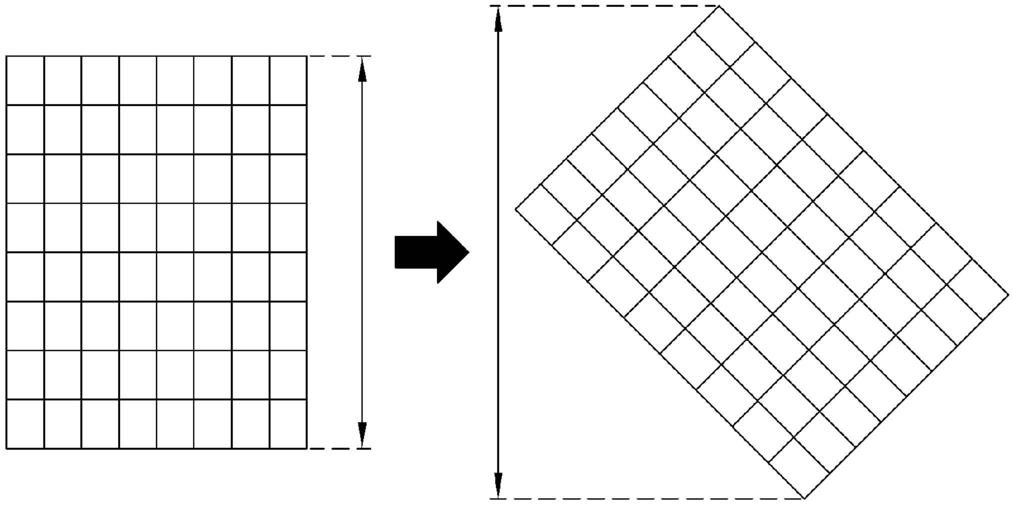
FIG. 11 is a view illustrating a pixel arrangement of a receiver of a LIDAR sensor according to an exemplary embodiment of the present invention.
Figure 12:
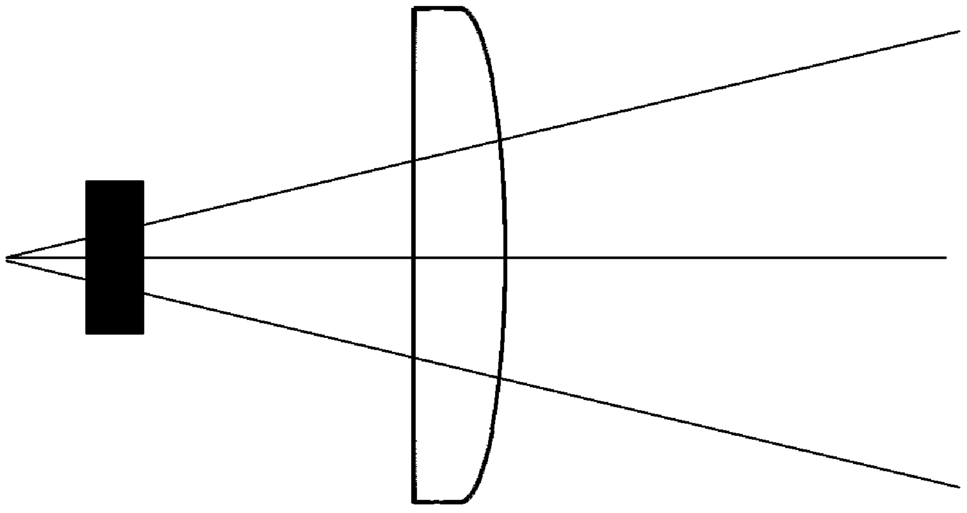
FIG. 12 is a view illustrating a lens of a receiver of a LIDAR sensor according to an exemplary embodiment of the present invention.

FIG. 11 is a view illustrating a pixel arrangement of a receiver of a LIDAR sensor according to an exemplary embodiment of the present invention. FIG. 12 is a view illustrating a lens of a receiver of a LIDAR sensor according to an exemplary embodiment of the present invention.

The receiver receives light reflected from the object to measure a distance to the object. The receiver may be implemented by a ToF camera. The ToF camera includes a camera lens and a ToF array. The ToF array outputs an intensity.

A filter which blocks light of a predetermined wavelength band may be mounted in the receiver.

In the receiver, the pixel arrangement is formed in a rectangle shape and the rectangle is installed at a predetermined tilting angle to increase a vertical resolution.

The transmission/reception module may include a thermometer. The thermometer may be installed in the inside or the outside of the transmission/reception module. The thermometer may be located in other position of the LIDAR sensor. The first controller may compensate for an error of a measured distance according to a temperature measured by the thermometer based on stored temperature data.

Figure 13:
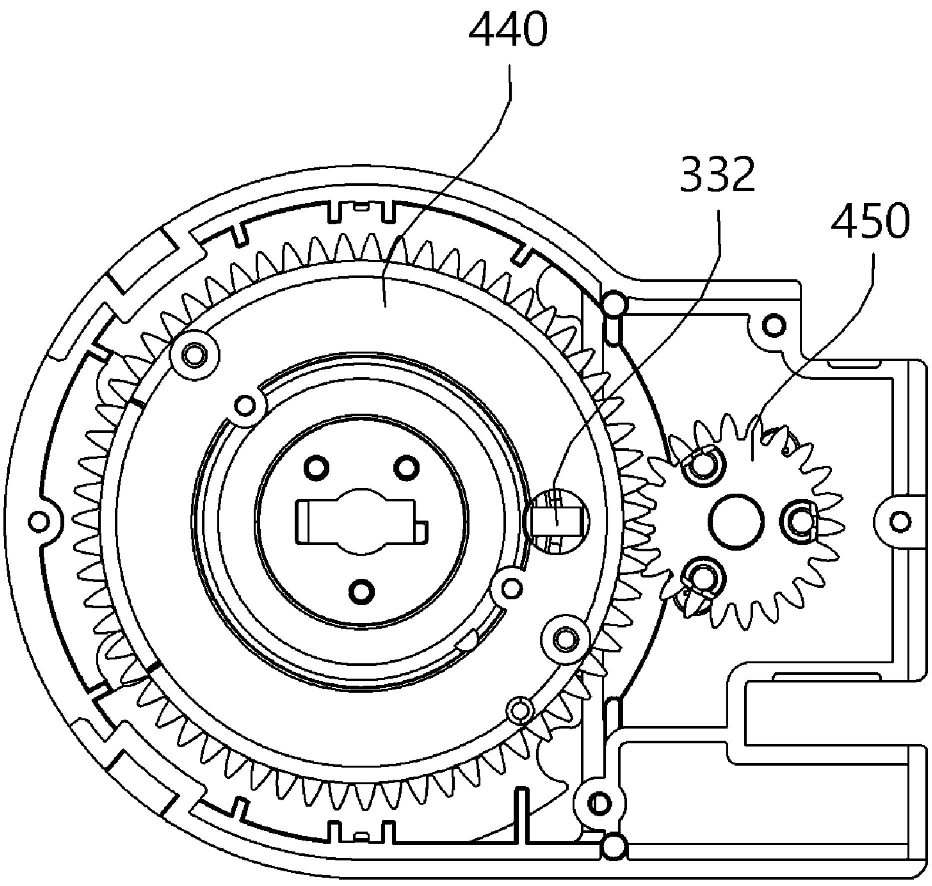
FIG. 13 is a view illustrating a gear placement of a LIDAR sensor according to an exemplary embodiment of the present invention.
Figure 14A:
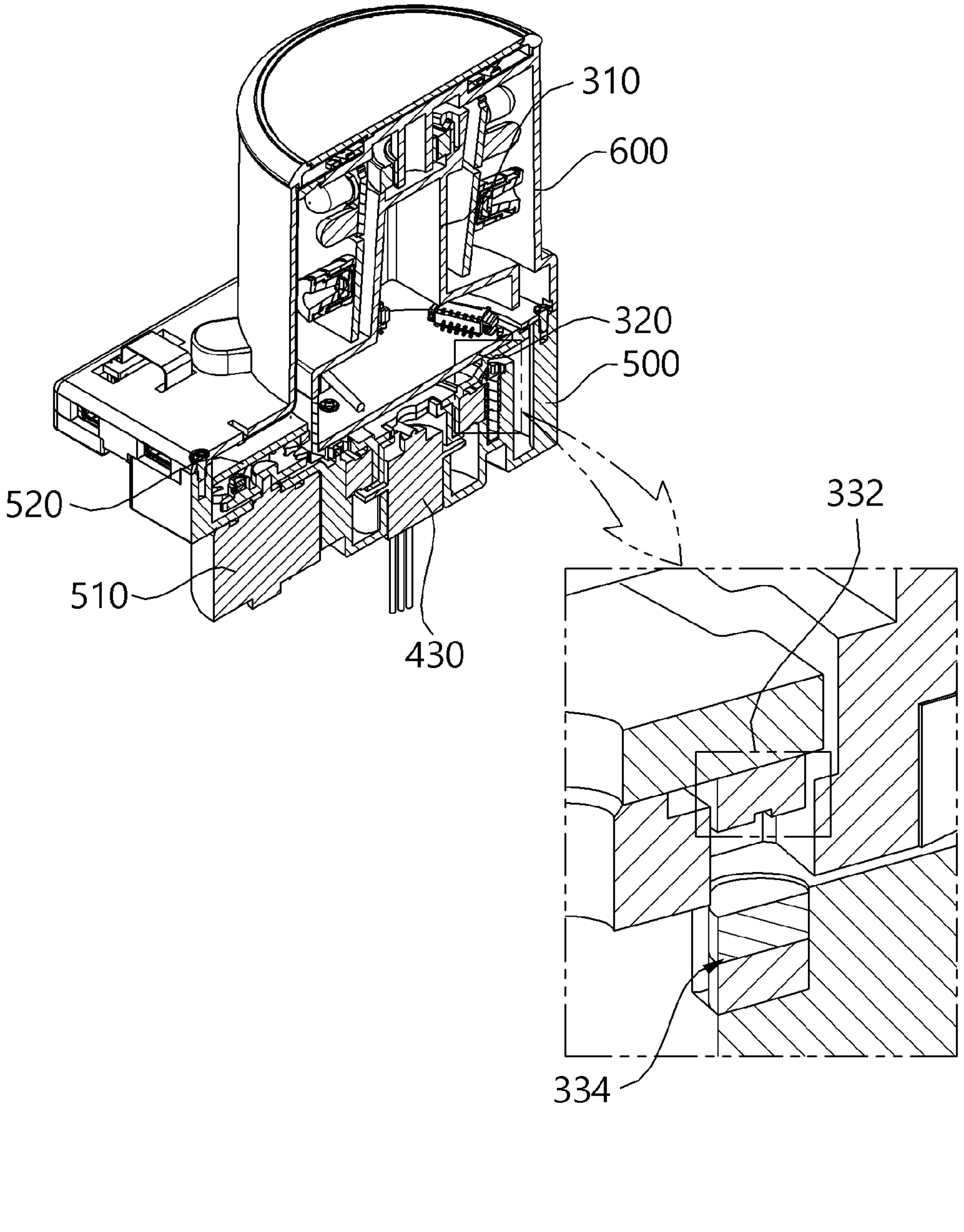
FIGS. 14A and 14B are views illustrating a first position sensor set of a LIDAR sensor according to an exemplary embodiment of the present invention.
Figure 14B:
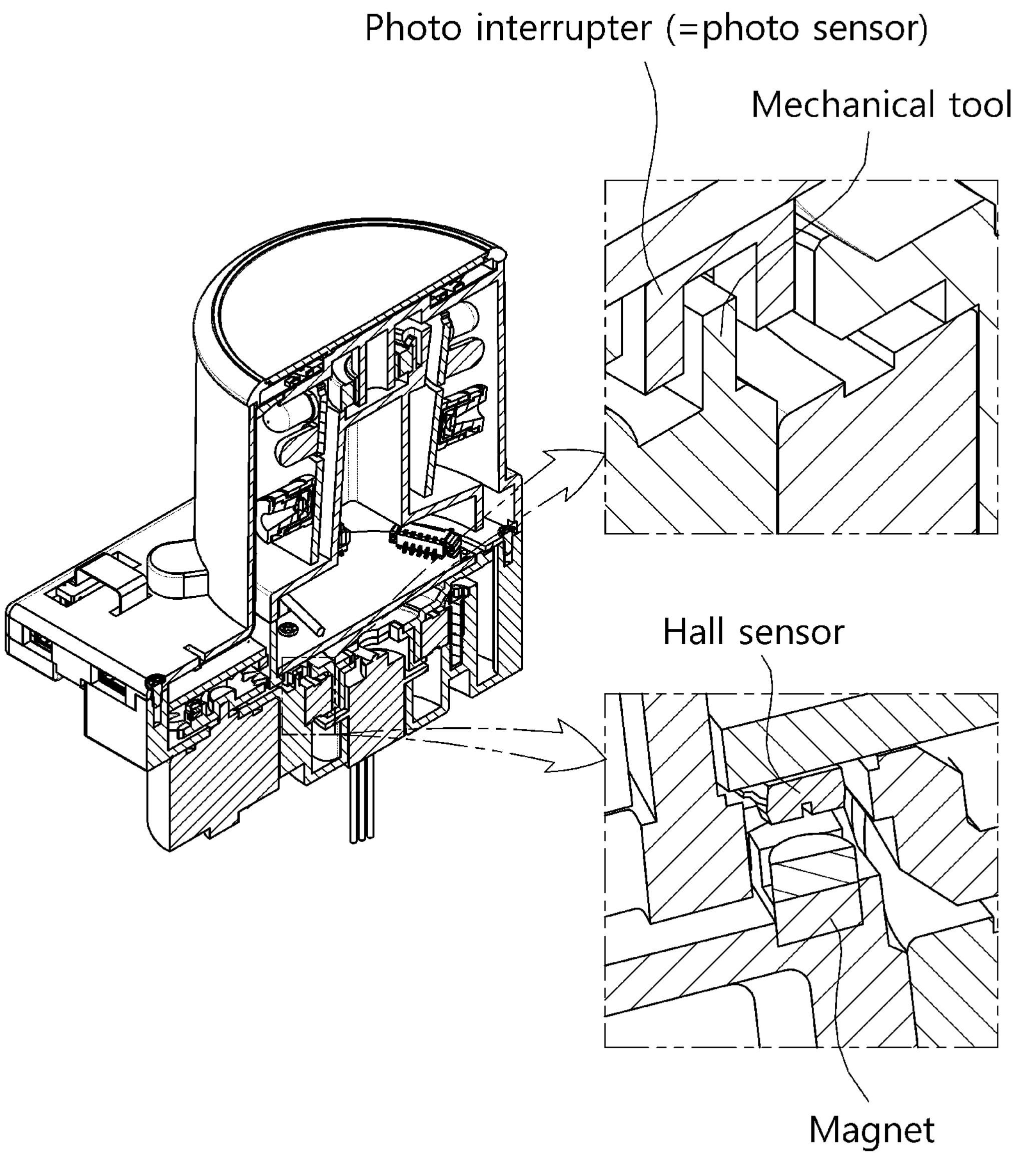
Figure 15A:
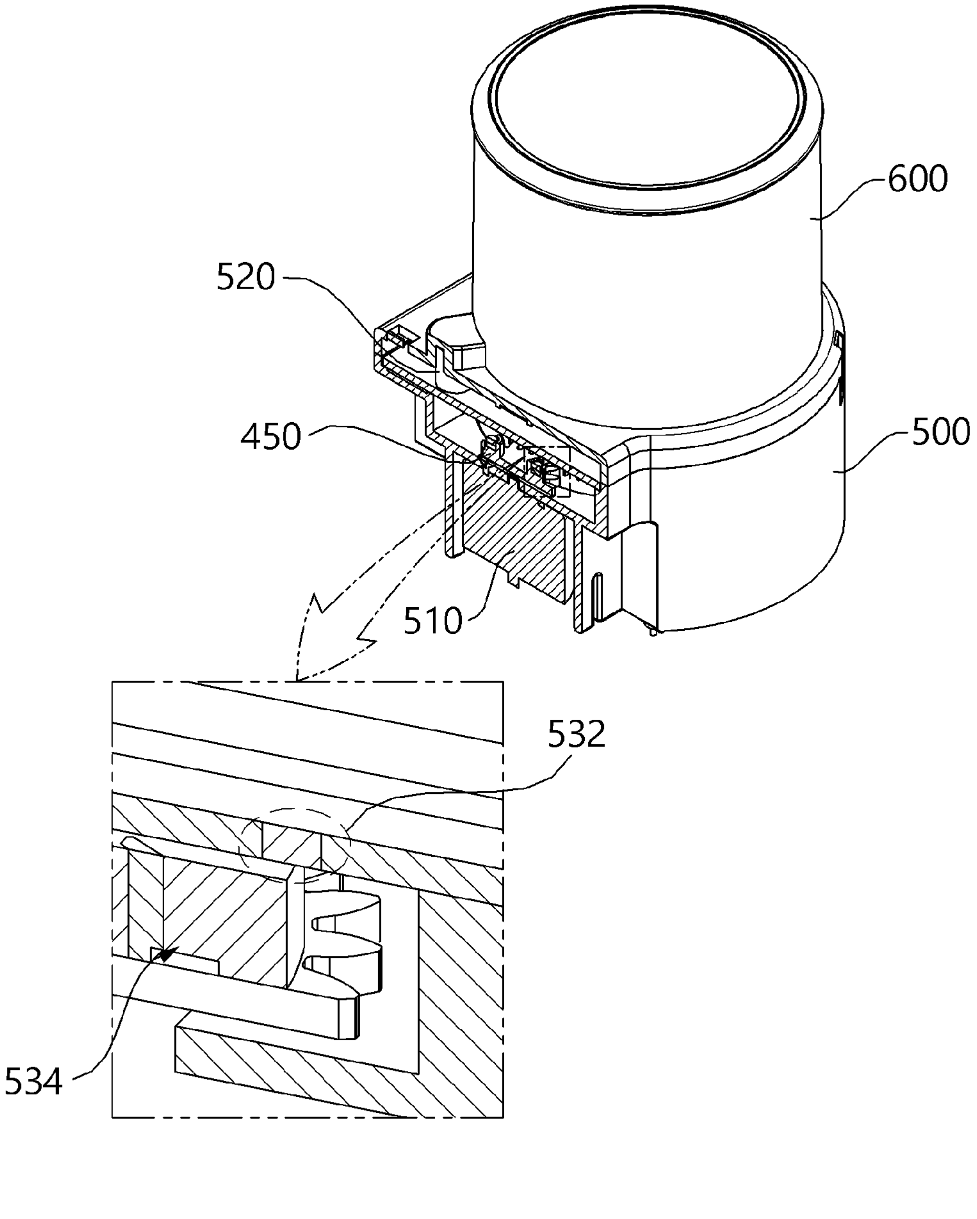
FIGS. 15A and 15B are views illustrating a second position sensor set of a LIDAR sensor according to an exemplary embodiment of the present invention.
Figure 15B:
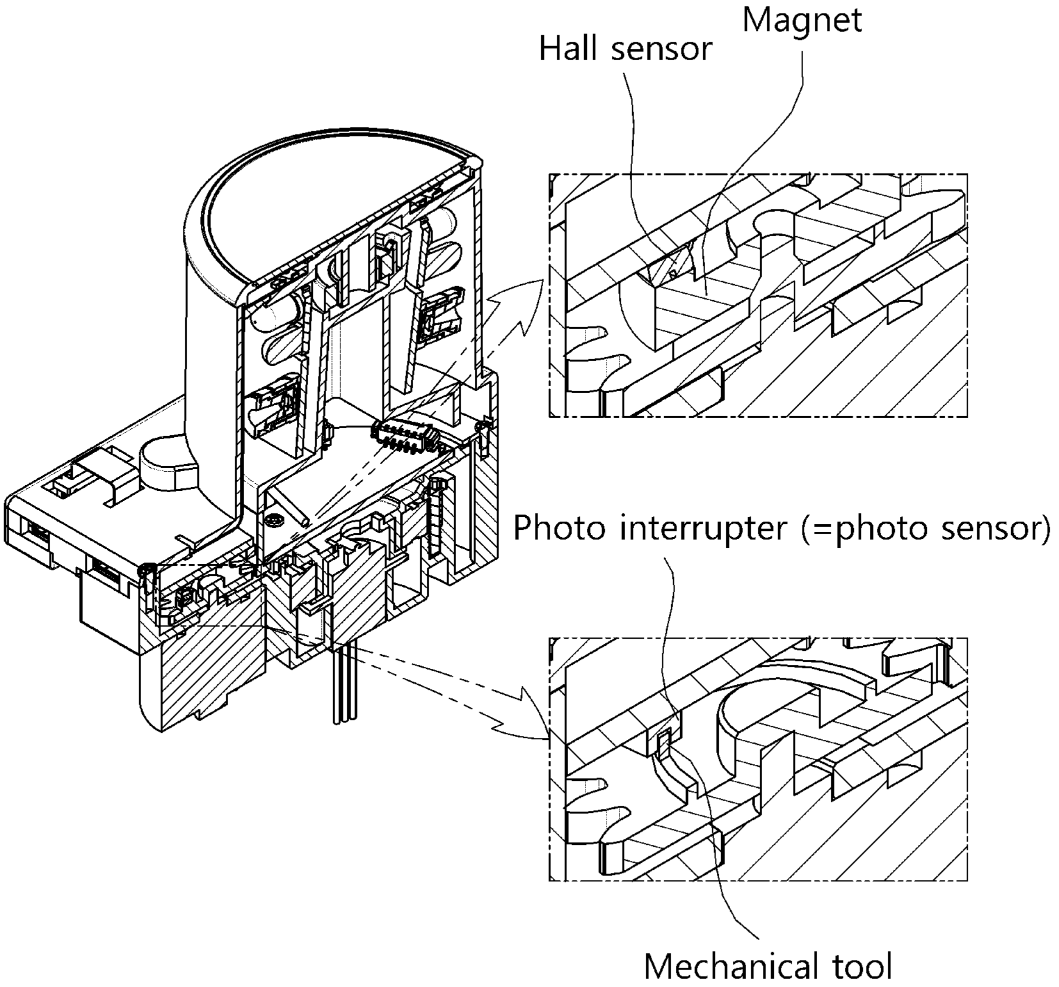

FIG. 13 is a view illustrating a gear placement of a LIDAR sensor according to an exemplary embodiment of the present invention, FIG. 14 is a view illustrating a first position sensor set of a LIDAR sensor according to an exemplary embodiment of the present invention, and FIG. 15 is a view illustrating a second position sensor set of a LIDAR sensor according to an exemplary embodiment of the present invention, and The connection module may include a first gear 440 disposed at a lower end of the rotary column and a second gear 450 which is disposed in the fixing module to rotate while being engaged with the first gear. The gear may be replaced with a belt.

The fixing module includes a motor which is disposed on a side surface of the fixing module to rotate the second gear, a rotation axis of the first gear and a rotation axis of the second gear are disposed in parallel, and the rotation axis of the second gear and a rotation axis of the motor match.

The rotary module may include a first position sensor set including a first signal transmitter and a first signal receiver. The rotary module may include a second controller which calculates a rotation speed and a rotation position of the rotary module or the first gear using the first signal collected by the first signal receiver.

The fixing module may include a second position sensor set including a second signal transmitter and a second signal receiver. The fixing module may include a third controller which calculates a rotation speed and a rotation position of the motor or the second gear using the second signal collected by the second signal receiver.

The first signal receiver calculates an angle using a previous rotation period so that when the period varies due to the friction or control, there may be an error in rotation recognizing information.

Figure 19:
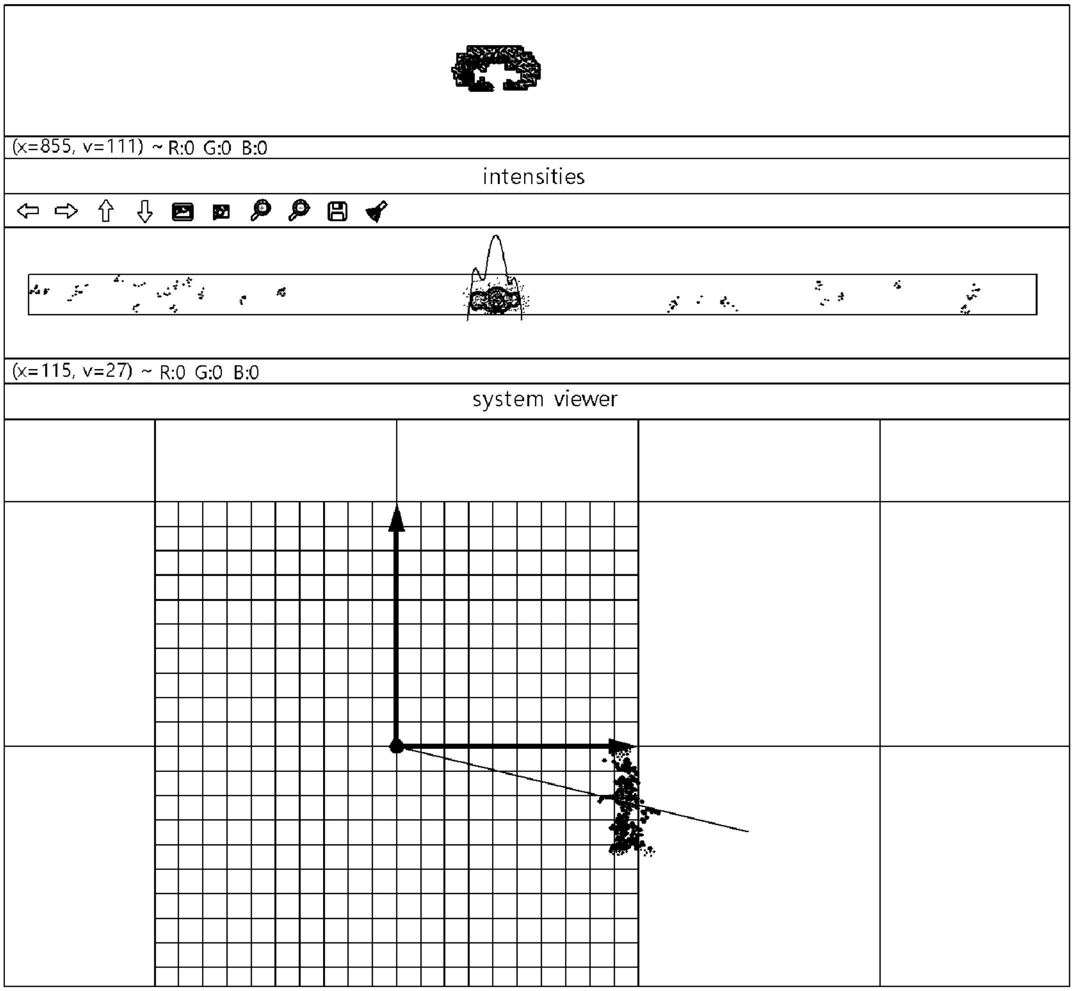
FIGS. 19 to 21 are views illustrating a distance, an intensity, and an angle acquired by a LIDAR sensor according to an exemplary embodiment of the present invention.
Figure 20:
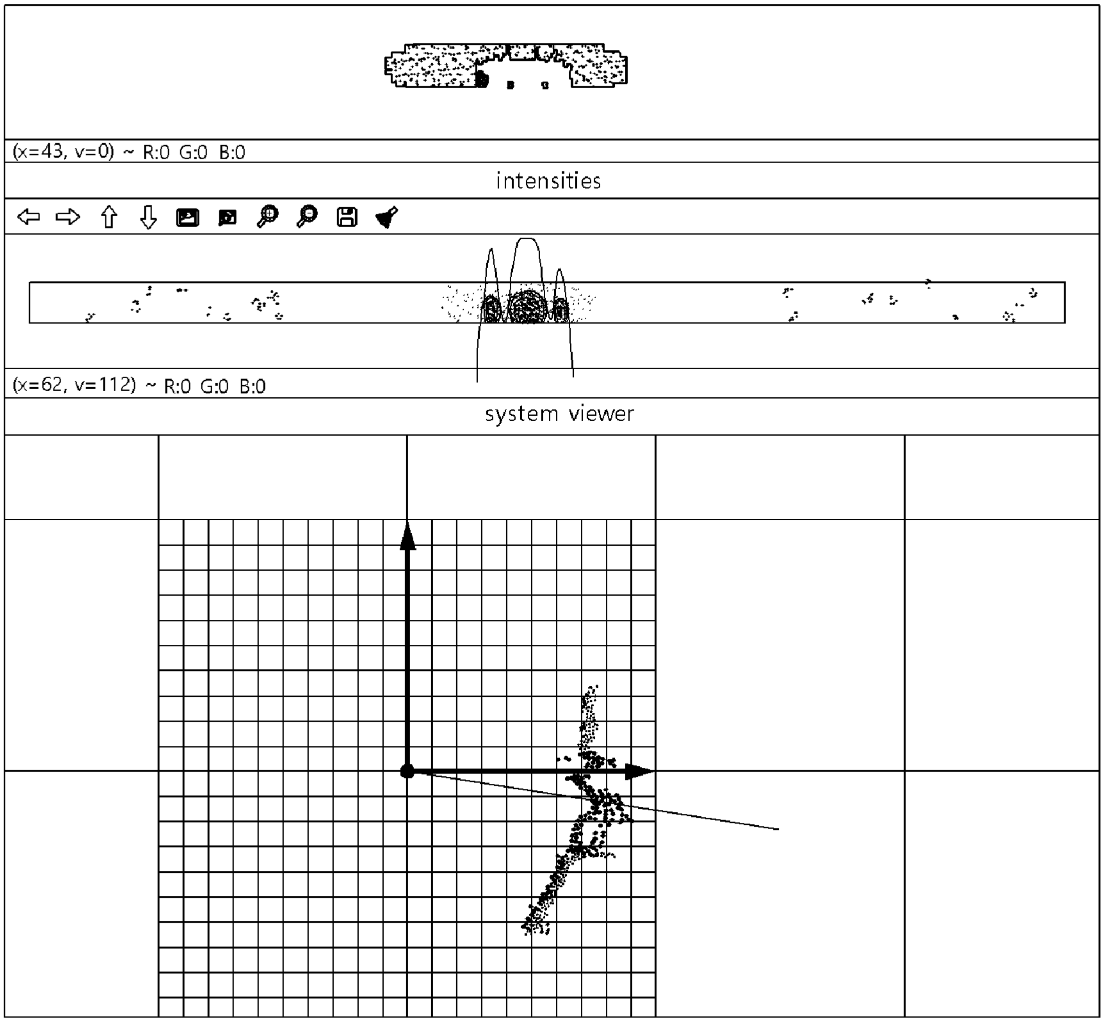
Figure 21:
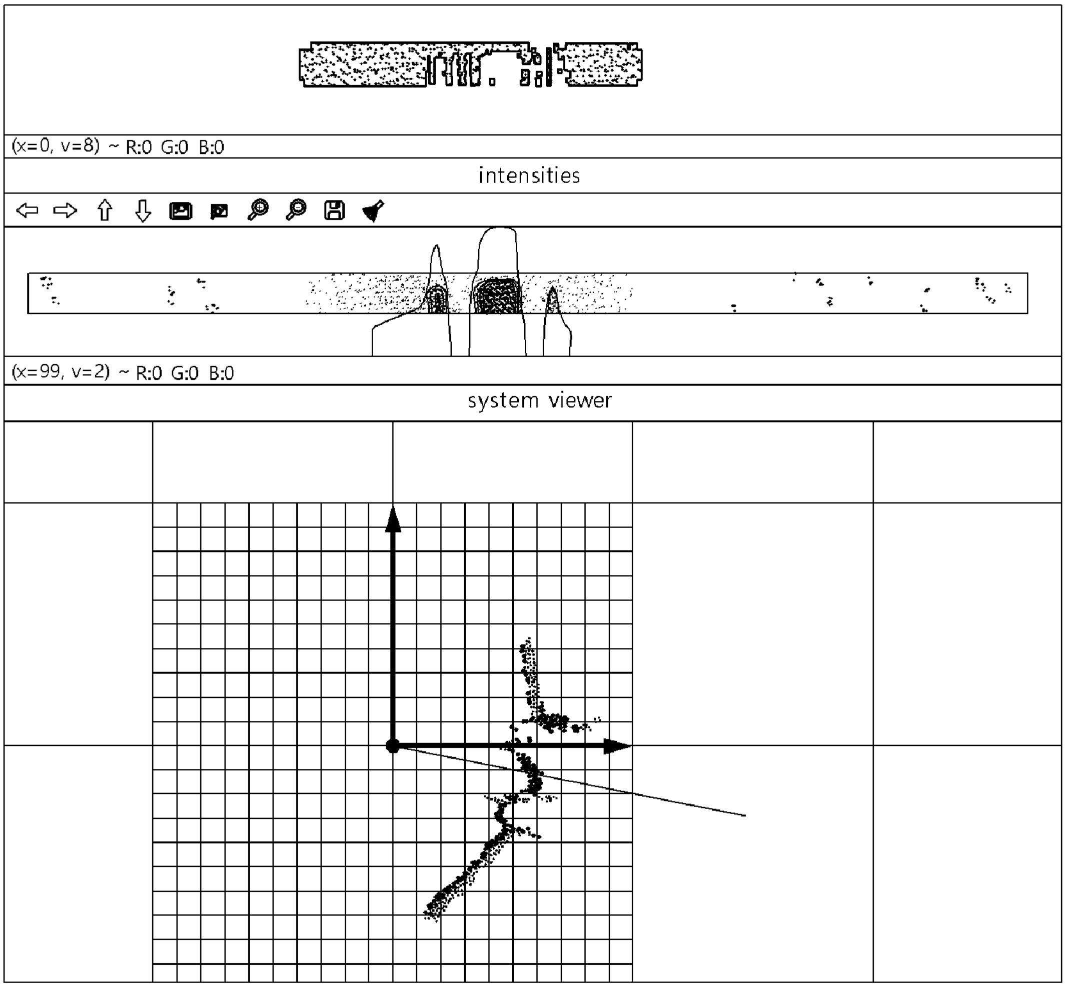
Figure 22:
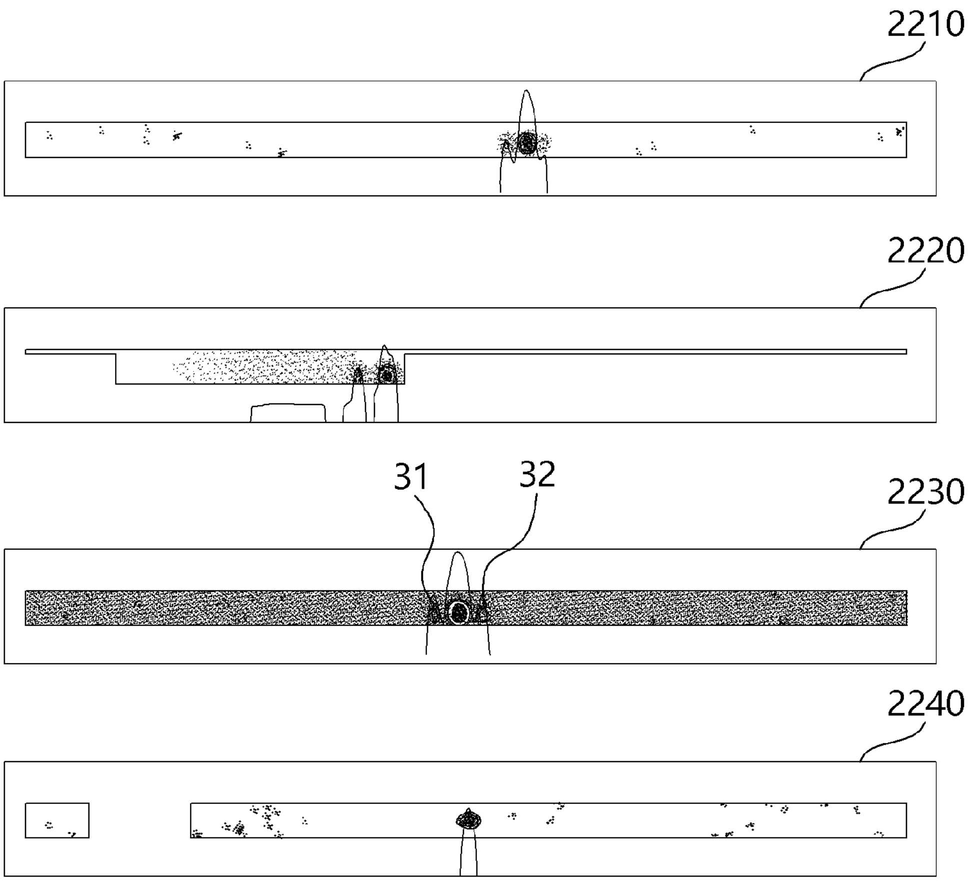
FIGS. 22 and 23 are views illustrating an intensity acquired by a LIDAR sensor according to an exemplary embodiment of the present invention.
Figure 23:
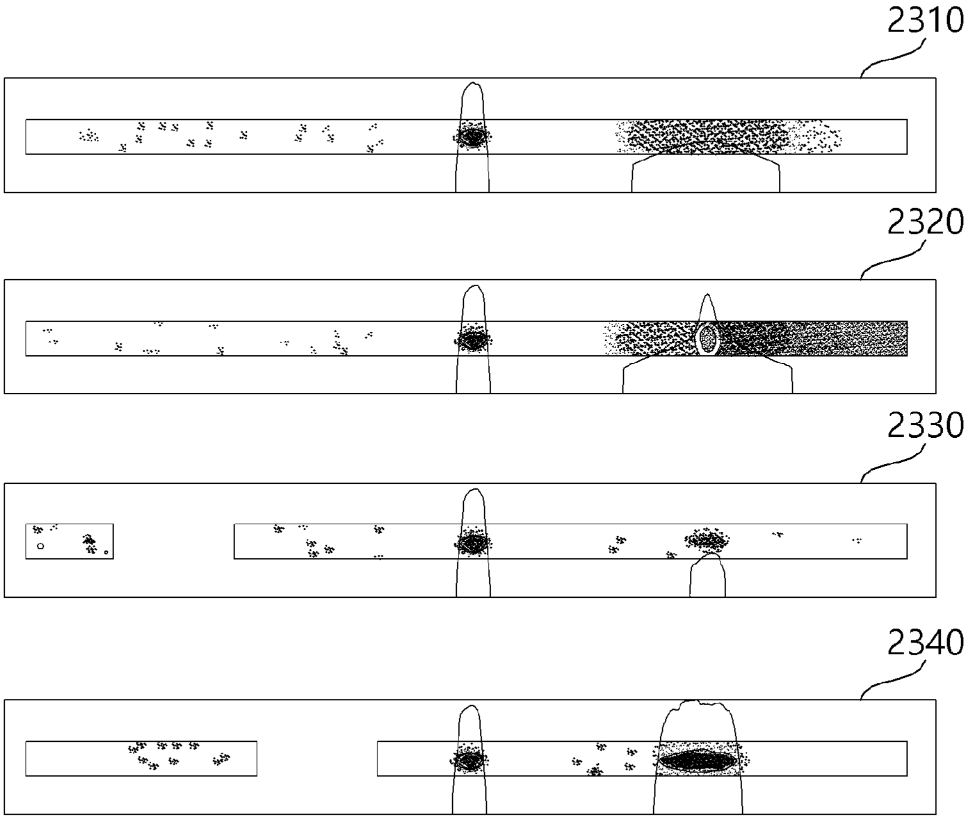

A plurality of first signal receivers is provided and is disposed to be spaced apart from each other. When the plurality of first signal receivers is too close, the plurality of first signal receivers is recognized as one so that the plurality of first signal receivers is spaced apart from each other with a predetermined distance. The plurality of first signal receivers may compensate for an error of the rotation speed and the rotation position of the rotary module or the first gear in accordance with a result of analyzing the plurality of first signal. The signal acquired by the plurality of first signal receives is statistically processed or partially selected in accordance with a result obtained by comparing with a predetermined set state data FIGS. 16 to 18 are views illustrating an intensity acquired by a LIDAR sensor according to an exemplary embodiment of the present invention, FIGS. 19 to 21 are views illustrating a distance, an intensity, and an angle acquired by a LIDAR sensor according to an exemplary embodiment of the present invention, and FIGS. 22 and 23 are views illustrating an intensity acquired by a LIDAR sensor according to an exemplary embodiment of the present invention.

Figure 16:
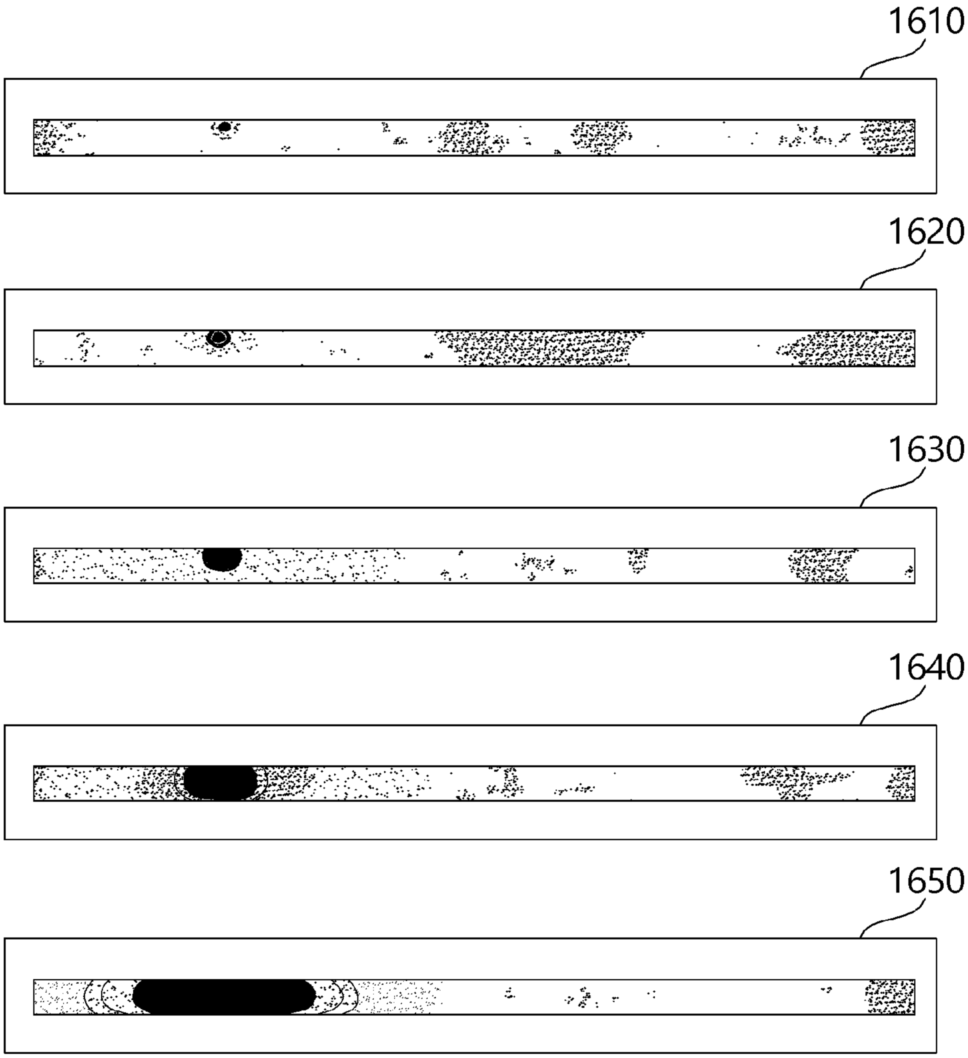
FIGS. 16 to 18 are views illustrating an intensity acquired by a LIDAR sensor according to an exemplary embodiment of the present invention.

In FIG. 16, a reflector having a low reflectance is located in positions 2.0 m (1610), 1.5 m (1620), 1.0 m (1630), 0.5 m (1640), 0.3 (1650) and an optical signal amplitude acquired by seeing the reflector from the front is illustrated. It is understood that the shorter the distance, the larger the circle in a left area.

Figure 17:
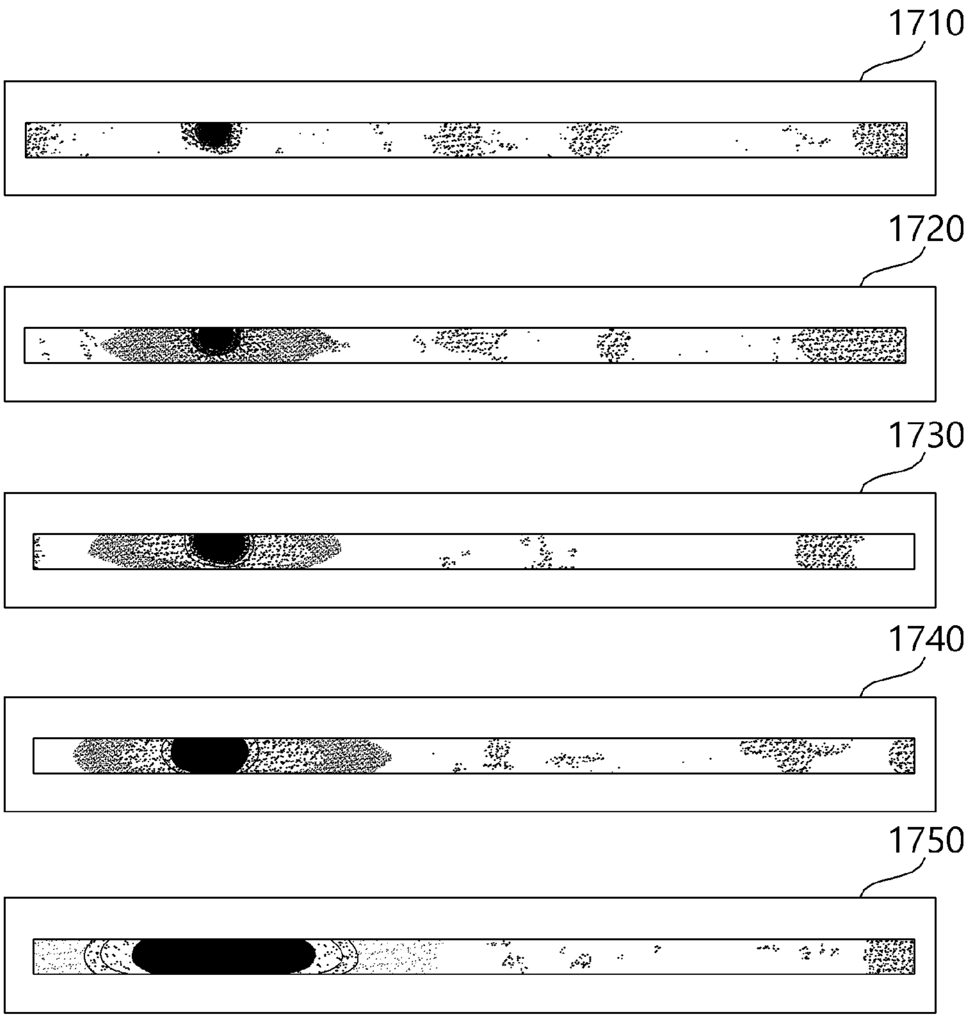

In FIG. 17, a reflector having a high reflectance is located in positions 2.0 m (1710), 1.5 m (1720), 1.0 m (1730), 0.5 m (1740), 0.3 (1750) and an optical signal amplitude acquired by seeing the reflector from the front is illustrated. It is understood that the shorter the distance, the larger the circle in a left area.

Figure 18:
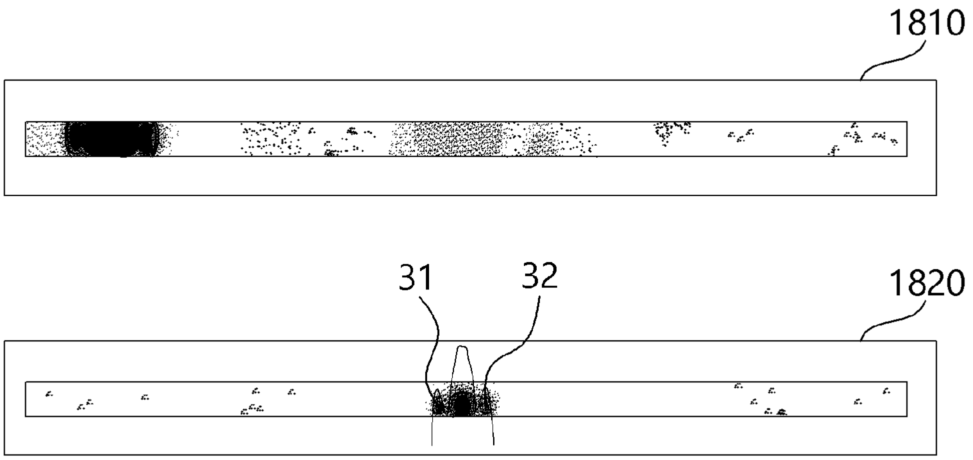

FIG. 18 illustrates an optical signal amplitude obtained by placing a reflector having a reflective pattern area in a near field 1810 and a far field 1820. By doing this, the reflection areas 31 and 32 may be identified.

The first controller may control the exposure time and the intensity of the light according to the reference distance which distinguishes the near field from the far field. The first controller may adjust the exposure time and the intensity of the light with respect to the remainder obtained by dividing the RPM of the rotary module by a predetermined integer.

Referring to FIGS. 19 to 21, the LIDAR sensor extracts a relative angle with respect to the object (reflector) at the center to follow a center line only using the angle, excluding the distance value.

The transmission/reception module extracts a relative angle with the reflector based on a reflective pattern according to the intensity of the reflected light, by a reflectance of the reflector.

The first controller outputs a control command with regard to a center direction of the reflector using the relative angle. The first controller compares the reflective pattern and the stored reference pattern to find a center direction of the reflector in a direction that an error of the difference satisfies a reference range. The reflective pattern includes a first reflection area and a second reflection area and the first controller may find the center direction of the reflector such that a size of the first reflection area and a size of the second reflection area become the same.

Referring to FIG. 22, when the LIDAR sensor is offset in a side direction (Y-axis), with respect to the reflector located in a middle field 2210 and a near field 2220, a reflective pattern which is different from the reflective pattern may be obtained.

When the LIDAR sensor moves to the front of the reflector, it is found that the left level is the same as the right level, like the middle field 2230. The LIDAR may move to the front to track without calculating a relative position based on the reflective pattern. In the far field 2240, it is difficult to calculate the offset at the left side and the right side, so that the moving operation in a corresponding direction is performed. It moves in the corresponding direction until it recognizes the reference pattern within the error range, such as a prominent line.

A principle of removing an outlier will be described with reference to FIG. 23.

In a situation 2310 in which a search target is 1.3 m ahead and a very large bright brown box is placed 1.2 m to the left, an optical signal amplitude is not sufficiently high.

In a situation 2320 in which a search target is 1.3 m ahead and a very large white box is placed 0.2 m to the left, an optical signal amplitude is not sufficiently high.

In a situation 2330 in which a search target is 1.3 m ahead and an aluminum panel which is similar to the docking station is placed 0.4 m to the left, an optical signal amplitude is not sufficiently high.

In a situation 2340 in which a search target is 1.3 m ahead and an aluminum panel which is similar to the docking station is placed 0.2 m to the left, a sufficiently high optical signal amplitude is maintained. However, in a near field situation, a left/right auxiliary lines are not seen. That is, the reflective pattern corresponding to the reference pattern needs to be recognized with an appropriate level of optical signal amplitude.

Figure 24:
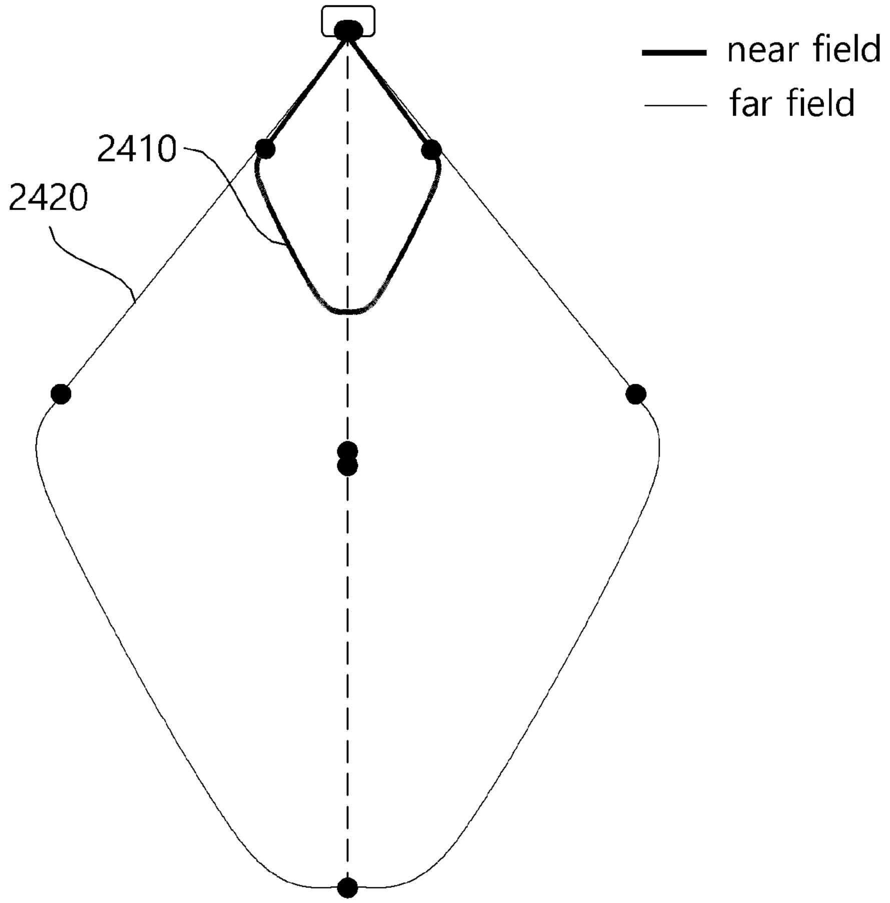
FIGS. 24 to 26 are views illustrating a sensing area sensed by a LIDAR sensor according to an exemplary embodiment of the present invention.
Figure 25:
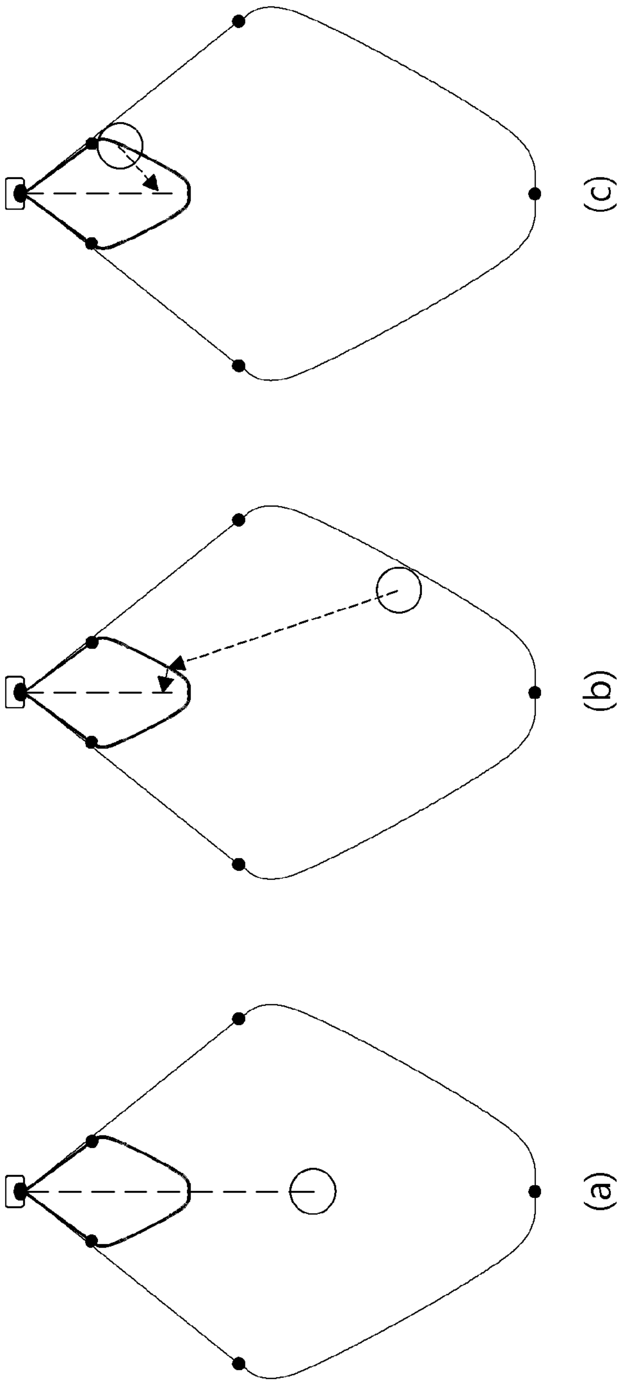
Figure 26:
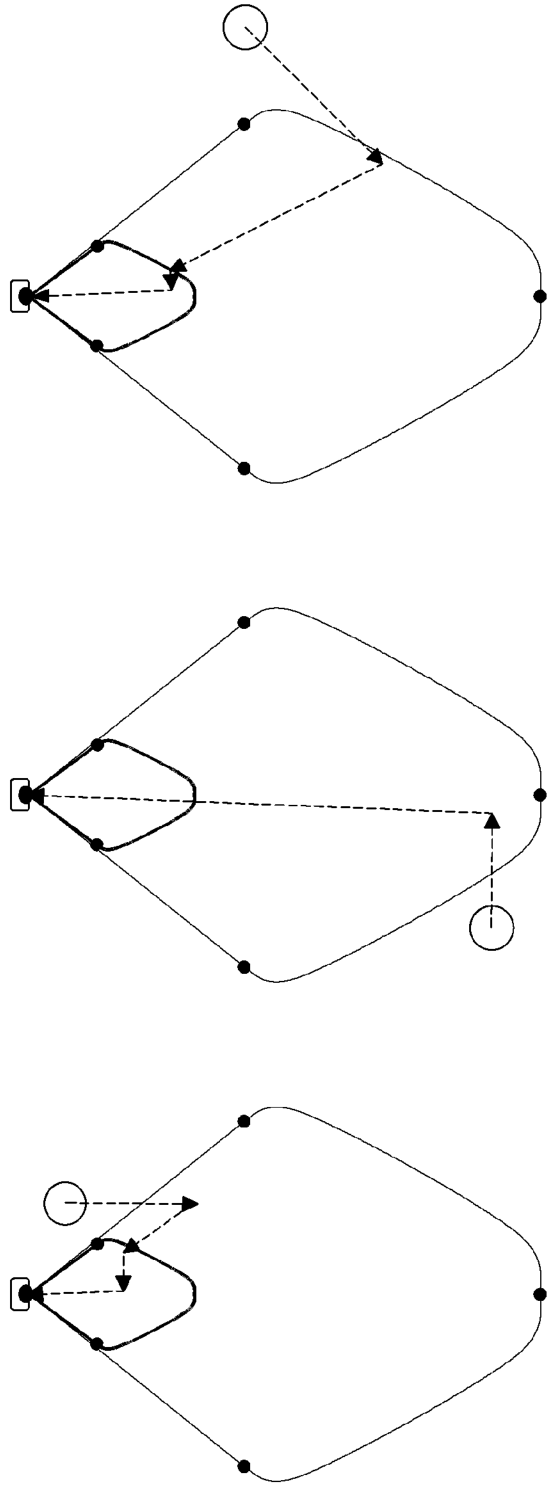

FIGS. 24 to 26 are views illustrating a sensing area sensed by a LIDAR sensor according to an exemplary embodiment of the present invention.

Sensing areas 2410 and 2420 with respect to the docking station have a rhombus shape so that the width increases to a predetermined distance and then narrows as the distance increases. In order to increase the sensing range, the reflector is changed.

FIG. 25 illustrates a docking process under the assumption that wall information (angle) is not known.

As illustrated in FIG. 26, if the object is at the outside of the sensing area, when the object randomly moves and then enters the sensing area, the object is tracked.

Figure 27:
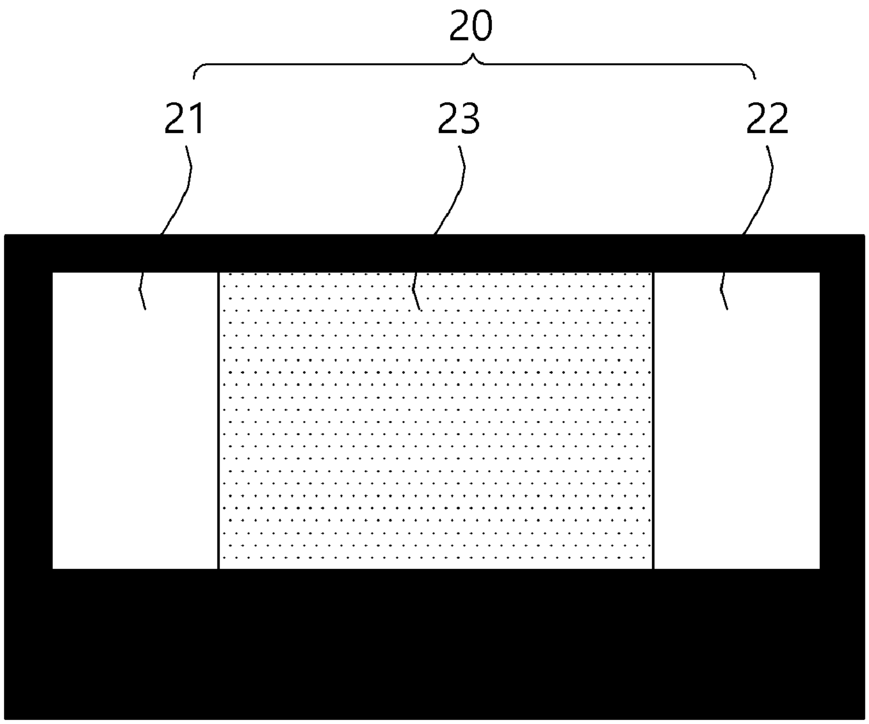
FIG. 27 is a view illustrating a reflector sensed by a LIDAR sensor according to an exemplary embodiment of the present invention.

FIG. 27 is a view illustrating a reflector sensed by a LIDAR sensor according to an exemplary embodiment of the present invention. In the reflector 20, a non-reflective pattern area 23 is formed at the center and reflective patterns 21 and 22 are partially formed at the left and right.

The LIDAR sensor compares the reflector pattern which is obtained by being reflected from the reflective pattern area and the reference pattern or compares the reflection area sets of the reflective pattern to extract a relative angle.

Figure 28:
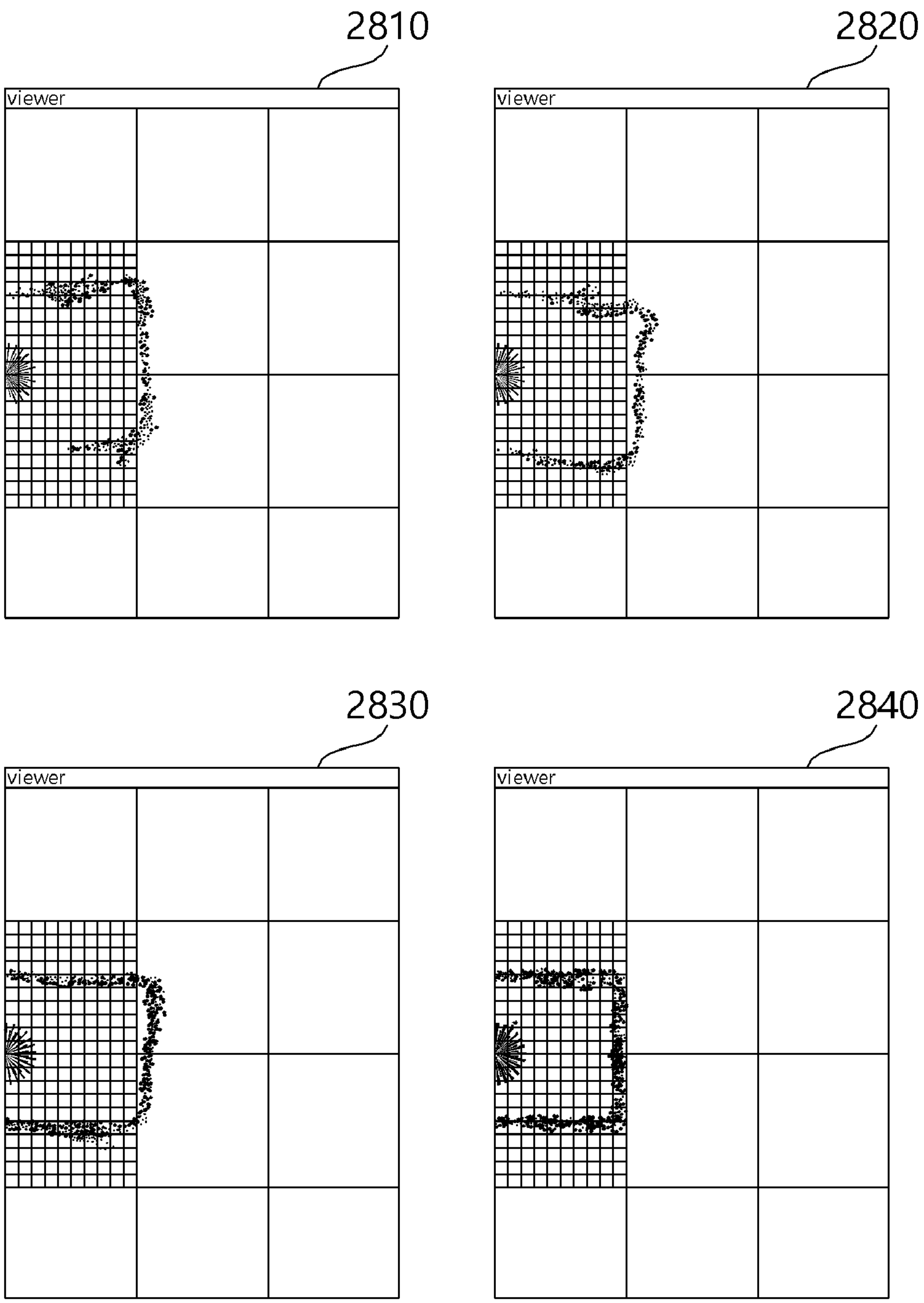
FIG. 28 is a view illustrating a point cloud acquired by a LIDAR sensor according to an exemplary embodiment of the present invention.
Figure 29:
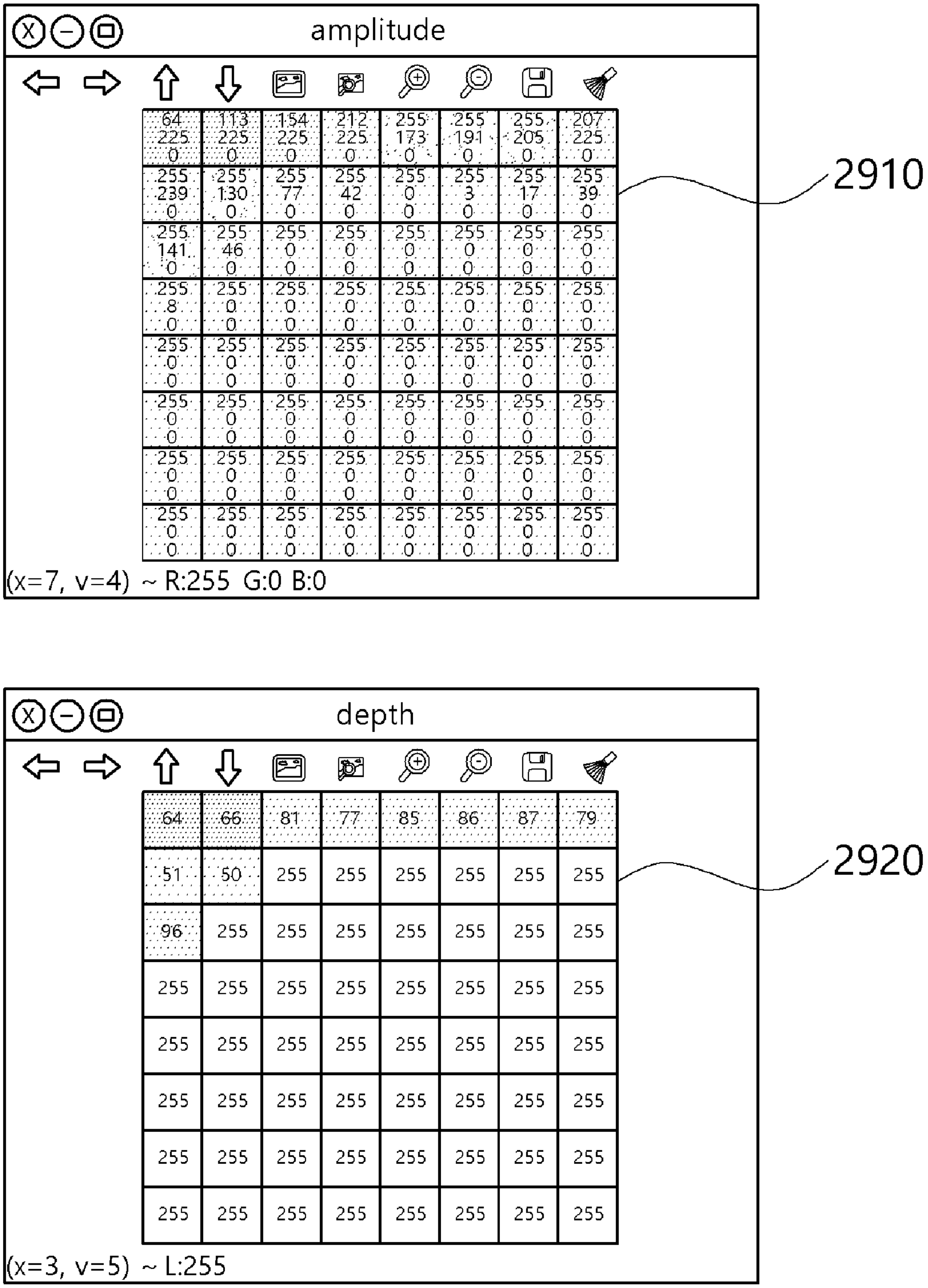
FIGS. 29 to 31 are views illustrating an intensity and a distance acquired by adjusting a power by a LIDAR sensor according to an exemplary embodiment of the present invention.
Figure 30:
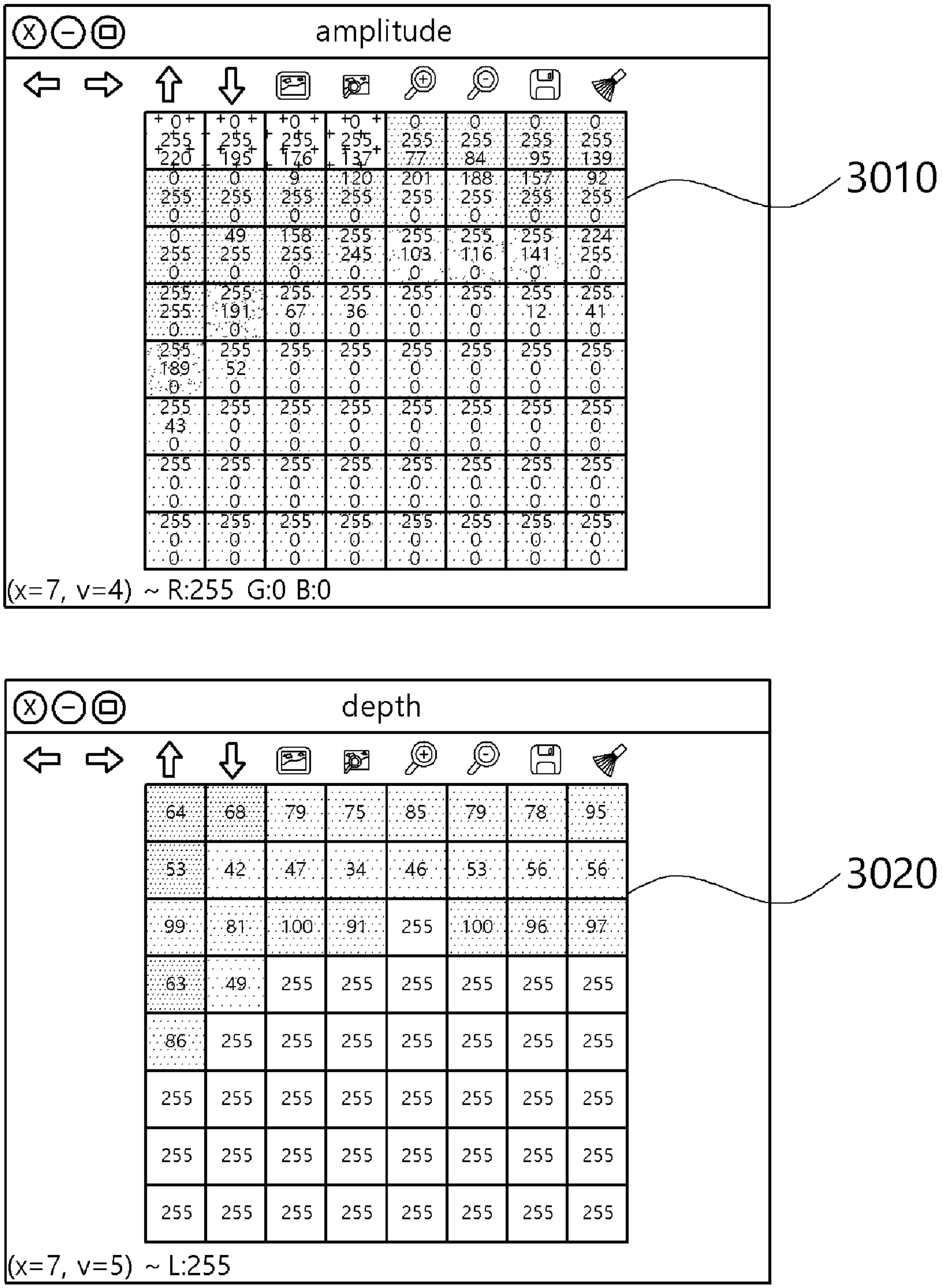
Figure 31:
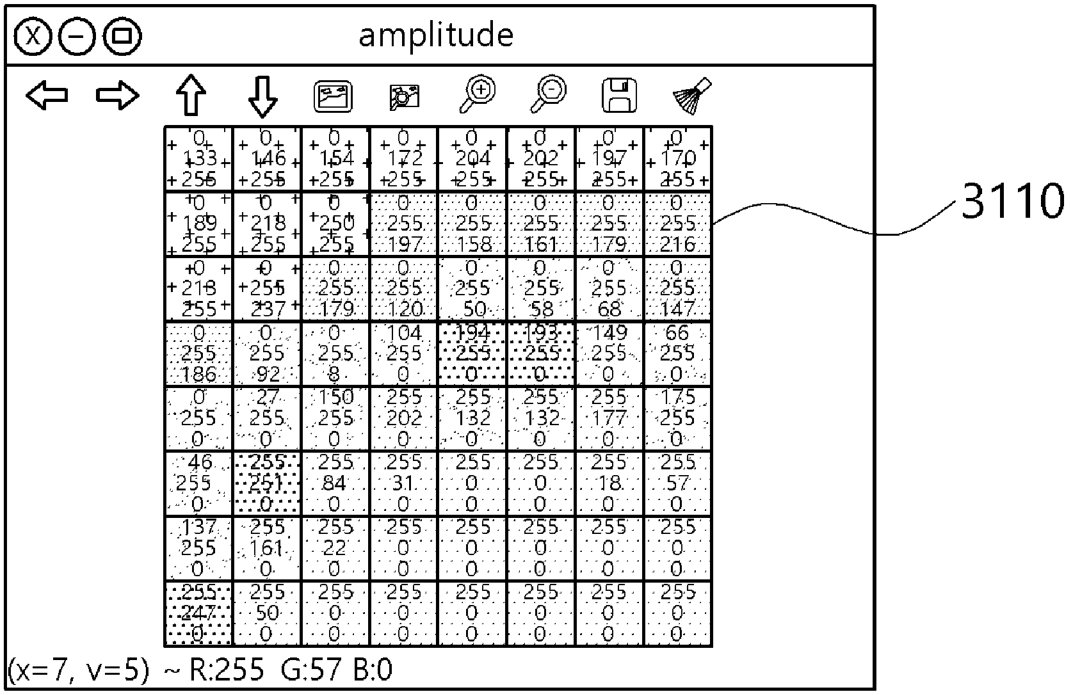
Figure 31:
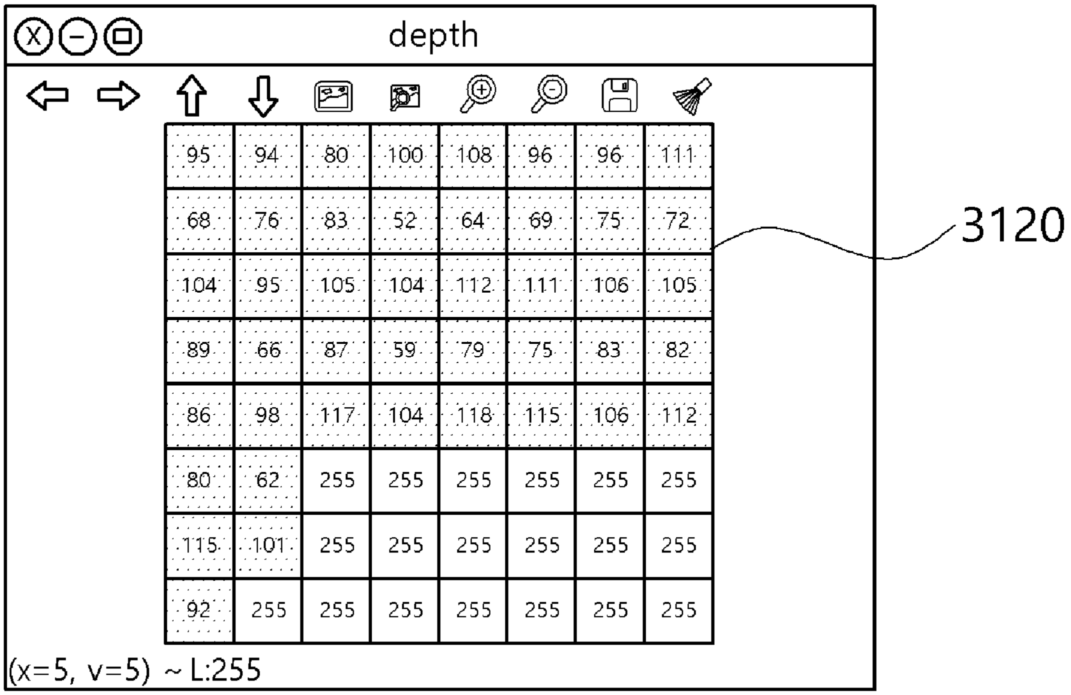

FIG. 28 is a view illustrating a point cloud acquired by a LIDAR sensor according to an exemplary embodiment of the present invention and FIGS. 29 to 31 are views illustrating an intensity and a distance acquired by adjusting a power by a LIDAR sensor according to an exemplary embodiment of the present invention.

Referring to FIG. 28, point clouds which are a quadrangular shape and obtained at shutter speeds of 6 msec (2810), 4 msec (2820), 2 msec (2830), and 0.4 msec (2840) are illustrated.

When the intensity or the power of the light is high in the near field, it is difficult to recognize the distance and the scan performance varies depending on how to set a period for a near-field scan and a far-field scan during the rotation.

The first controller may control the exposure time and the intensity of the light according to the reference distance which distinguishes the near field from the far field. For example, in the near field scan mode, the exposure time and the intensity may be reduced more than the far field scan mode.

The first controller may adjust the exposure time and the intensity of the light with respect to the remainder obtained by dividing the RPM of the rotary module by a predetermined integer. For example, when the RPM is an odd number, the near field scan mode may be set and when the RPM is an even number, the far field scan mode may be set.

A plurality of components included in the LIDAR sensor is combined to each other to be implemented by at least one module. The components are connected to a communication path which connects a software module or a hardware module in the apparatus to organically operate between the components. The components communicate with each other using one or more communication buses or signal lines.

The LIDAR sensor and the moving object may be implemented in a logic circuit by hardware, firm ware, software, or a combination thereof or may be implemented using a general purpose or special purpose computer. The apparatus may be implemented using hardwired device, field programmable gate array (FPGA) or application specific integrated circuit (ASIC). Further, the apparatus may be implemented by a system on chip (SoC) including one or more processors and a controller.

The LIDAR sensor and the moving object may be mounted in a computing device provided with a hardware element as a software, a hardware, or a combination thereof. The computing device may refer to various devices including all or some of a communication device for communicating with various devices and wired/wireless communication networks such as a communication modem, a memory which stores data for executing programs, and a microprocessor which executes programs to perform operations and commands.

The operation according to the exemplary embodiment of the present disclosure may be implemented as a program instruction which may be executed by various computers to be recorded in a computer readable medium. The computer readable medium indicates an arbitrary medium which participates to provide a command to a processor for execution. The computer readable medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

The invention claimed is:

1. A LIDAR sensor, comprising:

a transmission and reception module which transmits light and receives reflected light;

a rotary module which is connected to the transmission and reception module and is rotatable;

a connection module which transmits a torque to the rotary module and has the rotary module installed therein; and a fixing module which fixes the connection module thereto and transmits a power to the connection module, wherein the transmission and reception module is configured to analyze a waveform of the reflected light with one or more frequencies to measure a distance according to a time difference and acquire a point cloud, and a rotary column having a plurality of inclined surfaces is located in a rotation axis position of the rotary module, the fixing module is connected to a sensor cover having a protrusion structure which is inserted into a recessed space of an upper end of the rotary column, the transmission and reception module includes: a plurality of transmission and reception groups in which one or more transmitters and one or more receivers are disposed to be spaced apart from each other to be combined; and a first controller which is configured to control an operation of the plurality of transmission and reception groups, the plurality of transmission and reception groups is installed on the plurality of inclined surfaces, is directed to a predetermined vertical angle, is disposed in a predetermined horizontal direction, and is disposed in consideration of a center of gravity, the transmission and reception groups include: a first transmitter; a second transmitter which is horizontally disposed with the first transmitter; and a third transmitter which is vertically disposed between the first transmitter and the second transmitter, the transmitters including the first transmitter, the second transmitter, and the third transmitter include a separation film which is installed to be spaced apart from a body tube of the one or more receivers and blocks a light traveling path, and the first controller is configured to control an exposure time and an intensity of the light in accordance with a reference distance which distinguishes a near field from a far field, and adjusts the exposure time and the intensity of the light based on a remainder obtained by dividing a RPM of the rotary module by a predetermined integer.

2. The LIDAR sensor of claim 1, wherein a filter which blocks light of a predetermined wavelength band is mounted in the receiver.

3. The LIDAR sensor of claim 1, wherein in the receiver, pixel arrangement is formed in a rectangular shape and the rectangle is provided at a predetermined tilting angle to increase a vertical resolution.

4. The LIDAR sensor of claim 1, wherein the transmission and reception module includes a thermometer and the first controller compensates for an error of the measured distance according to a temperature measured by the thermometer based on stored temperature data.

5. The LIDAR sensor of claim 1, wherein the transmission and reception module extracts a relative angle with a reflector based on a reflection pattern according to the intensity of the reflected light by a reflectance of the reflector.

6. The LIDAR sensor of claim 5, wherein the first controller outputs a control command about a center direction of the reflector using the relative angle.

7. The LIDAR sensor of claim 5, wherein the first controller compares the reflective pattern and a stored reference pattern to find a center direction of the reflector in a direction that an error of the difference satisfies a reference range.

8. The LIDAR sensor of claim 5, wherein the reflective pattern has a first reflective area and a second reflective area and the first controller finds a center direction of the reflector in a direction that a size of the first reflective area and a size of the second reflective area become equal.

9. The LIDAR sensor of claim 1, wherein the connection module includes:

a second bearing disposed at a lower end of the rotary column; and a slip ring which passes through an imaginary line formed by extending the rotary shaft of the second bearing.

10. The LIDAR sensor of claim 9, wherein the connection module includes a first bearing which is disposed on an upper end of the rotary column and an imaginary line formed by extending the rotation axis of the first bearing matches an imaginary line formed by extending the rotation axis of the second bearing, and the protrusion structure of the sensor cover is inserted into a center of the first bearing corresponding to the first bearing being located in a recessed space of the upper end of the rotary column.

11. The LIDAR sensor of claim 1, further comprising:

a sensor cover which has a protrusion structure which is inserted into a recessed space of the upper end of the rotary column and is connected to the fixing module, wherein the sensor cover transmits or absorbs light of a predetermined wavelength band.

12. The LIDAR sensor of claim 1, further comprising:

a display unit which displays status information of the LIDAR sensor at the upper end of the sensor cover.

13. The LIDAR sensor of claim 1, wherein the connection module includes a first gear disposed at a lower end of the rotary column and a second gear which is disposed in the fixing module to rotate while being engaged with the first gear, the fixing module includes a motor which is disposed on a side surface of the fixing module to rotate the second gear, a rotation axis of the first gear and a rotation axis of the second gear are disposed in parallel, and the rotation axis of the second gear and a rotation axis of the motor match.

14. The LIDAR sensor of claim 13, wherein the rotary module includes:

a first position sensor set which is implemented by a magnet and a hall sensor based on a magnet signal or implemented by a protruding structure which passes between photo interrupters, and includes a first signal transmitter and a first signal receiver; and a second controller which is located at a lower end of the rotary module, is connected to the first signal receiver, and calculates a rotational speed and a rotation position of the rotary module or the first gear using a first signal collected by the first signal receiver, wherein a first signal is a signal acquired by the hall sensor or the photo interrupters in accordance with rotation of the rotary module, the first signal transmitter and the first signal receiver are installed in an inside of the fixing module and in the second controller, respectively, the hall sensor or the photo interrupters are connected to the second controller, and the magnet or the protruding structure is connected to the inside of the fixing module, wherein the-fixing module includes:

a third controller which is located at a upper side end of the fixing module and calculates a rotational speed and a rotation position of the motor or a second gear using a second signal collected by a second signal receiver; and a second signal receiver which is connected to the third controller.

15. The LIDAR sensor of claim 14, wherein a plurality of first signal receivers is disposed to be spaced apart from each other, the plurality of first signal receivers compensates for an error of the rotational speed and the rotation position of the rotary module or the first gear according to the result of analyzing the plurality of received first signals.

16. A mobile object, comprising:

a LIDAR sensor which transmits light, receives reflected light, is configured to analyze a waveform of the reflected light with one or more frequencies to measure a distance according to the time difference, and acquire a point cloud, and a moving device which is implemented to move the moving object based on the distance, wherein the LIDAR sensor includes:

a transmission and reception module which transmits light and receives reflected light;

a rotary module which is connected to the transmission and reception module and is rotatable;

a connection module which transmits a torque to the rotary module and has the rotary module installed therein; and a fixing module which fixes the connection module thereto and transmits a power to the connection module, wherein the transmission and reception module is configured to analyze a waveform of the reflected light with one or more frequencies to measure a distance according to a time difference and acquire a point cloud, a rotary column having a plurality of inclined surfaces is located in a rotary shaft position of the rotary module, the fixing module is connected to a sensor cover having a protrusion structure which is inserted into a recessed space of an upper end of the rotary column, the transmission and reception module includes: a plurality of transmission and reception groups in which one or more transmitters and one or more receivers are disposed to be spaced apart from each other to be combined; and a first controller which is configured to control an operation of the plurality of transmission and reception groups, the plurality of transmission and reception groups is installed on the plurality of inclined surfaces, is directed to a predetermined vertical angle, is disposed in a predetermined horizontal direction, and is disposed in consideration of a center of gravity, the transmission and reception groups include: a first transmitter; a second transmitter which is horizontally disposed with the first transmitter; and a third transmitter which is vertically disposed between the first transmitter and the second transmitter, the transmitters including the first transmitter, the second transmitter, and the third transmitter include a separation film which is installed to be spaced apart from a body tube of the one or more receivers and blocks a light traveling path, and the first controller is configured to control an exposure time and an intensity of the light in accordance with a reference distance which distinguishes a near field from a far field, and adjusts the exposure time and the intensity of the light based on a remainder obtained by dividing a RPM of the rotary module by a predetermined integer.

* * * * *